(12) United States Patent
Park

(10) Patent No.: US 7,056,459 B2
(45) Date of Patent: Jun. 6, 2006

(54) ETHYLENE VINYL ACETATE BASED FILM FOR CROSSLINKED BLOWN EVA FOAM, SHOE COMPONENTS USING THE SAME, AND METHOD FOR MANUFACTURING THEREOF

(76) Inventor: Hyung Jun Park, Jugong-3ch APT 301-2003 Jwa-dong, Haeundae-gu, Busan (KR)

( * ) Notice: Subject to any disclaimer, the term of this patent is extended or adjusted under 35 U.S.C. 154(b) by 76 days.

(21) Appl. No.: 10/602,893

(22) Filed: Jun. 25, 2003

(65) Prior Publication Data
US 2004/0261297 A1     Dec. 30, 2004

(51) Int. Cl.
*B29C 44/02* (2006.01)

(52) U.S. Cl. .................. 264/51; 264/45.1; 264/156; 264/245

(58) Field of Classification Search .............. 264/45.1, 264/54, 51, 53, 245, 156
See application file for complete search history.

(56) References Cited

U.S. PATENT DOCUMENTS

| | | | |
|---|---|---|---|
| 4,338,271 A * | 7/1982 | Kumasaka et al. ........... 264/54 |
| 5,503,786 A * | 4/1996 | Yang ..................... 264/46.4 |
| 6,129,798 A * | 10/2000 | Yang ......................... 156/79 |
| 6,299,806 B1 * | 10/2001 | Chen et al. ................ 264/45.1 |
| 6,787,079 B1 * | 9/2004 | Liu ......................... 264/46.4 |

FOREIGN PATENT DOCUMENTS

KR     10-0328508 B1     6/1999

* cited by examiner

*Primary Examiner*—Allan R. Kuhns
(74) *Attorney, Agent, or Firm*—Sughrue Mion, PLLC

(57) ABSTRACT

A method for manufacturing shoe components using EVA copolymer of film shape having a thickness of 0.01 to 2 mm, preferably 0.1 to 1.0 mm and a surface roughness variations which cannot be easily discriminated through touch or sight, and a shoe component manufactured by the method are provided. The method overcomes the drawbacks caused during the process of manufacturing a shoe component with different mechanical physical properties or colors. The method allows for ease of manufacture of a shoe component with two or more types of colors or physical properties, through a single foam molding process using a film with less variation and ease of processing, to thereby simplify manufacturing procedures and reduce manufacturing costs. In addition, a high quality shoe component with no additional seam-line is obtained.

18 Claims, 24 Drawing Sheets film type material cut acoording tp color film type material cut according to color/shape insert film type material combined colorant into mold insert structure insert film material combined structure remove streucture after foaming film type material cut
according to physical property or shape combined stacked material film type material according to physical property or shape combined stacked material film type material cut according to physical property or shape combined stacked material roll milling shaping by vacuum suction
or up-down press molding insert mold after
perforate patten cushion with thickness 1.0mm cylinder shape thickness 1.0mm of bottom 0.7mm of foaming shape thickness 0.7mm of foaming mold shape

ETHYLENE VINYL ACETATE BASED FILM FOR CROSSLINKED BLOWN EVA FOAM, SHOE COMPONENTS USING THE SAME, AND METHOD FOR MANUFACTURING THEREOF

BACKGROUND OF THE INVENTION

1. Field of the Invention

The present invention relates to an ethylene vinyl acetate (EVA) based compound film having a thickness of 0.01 to 2 mm, preferably, 0.1 to 1.0 mm, rather than a conventional form in sheet shape having a thickness of 2.5 to 3.0 mm or a palletized shape having a thickness of 3.0 to 4.0 mm and a height of 4 to 5.0 mm. The present invention also relates to shoe components including an insole, midsole, unitsole of midsole and outsole, an upper, and upper components. Shoe components produced through the manufacturing method using the film of the present invention have a wide variety of colors and outer appearances. In addition, it is possible to design and produce shoe components with their own colors and mechanical properties including density, hardness, abrasion, resiliency, compression set and stiffness/flexibility in consideration of function of each shoe component.

2. Description of the Related Art

In a conventional method, shoe components including an upper component, midsole, outsole, insole and a unitsole of midsole and outsole are produced by using a foamed article or articles obtained from the processes performed after completion of the foaming process, wherein the article is made of an EVA copolymer having a shape of a hard plate sheet, pellet or a chip having a thickness of 2.5 mm or higher, and a surface non-uniformity which can be easily discriminated by touch or sight. Shoe components are produced by a compression molding or injection molding process (primary process) and a compression re-molding process (secondary process). The above-described conventional method will be explained in detail with reference to FIG. 1, as follows. In FIG. 1, S stands for step.

Primary Process: Foam Molding Process (1) Compression Molding Process

A1) A material is selected, measured and weighed in consideration of the relations of the volume, physical property and expansion ratio or the mold cavity related to them. The pieces of the material obtained by cutting a sheet stock or weighing palletized EVA copolymer compound. (step SA1).

B1) The material is put into the cavity of an open/shut type compression molding mold which is proportionally miniatured shape of the shoe component by certain percentages in consideration of the relations between the volume of the crosslinked blown EVA form and expansion ratio of the compound. (step SB1).

The molding mold is pressed and heated for a predetermined time period (step SC1).

The molding die is released and rapidly open (step SD1), when it is possible to form a cell structure from the gas including $N_2$, $CO_2$, CO, $NH_3$ generated during the process of decomposition of the foaming agent during the step SC1, and the material in the molding die has a low viscosity permitting a foaming process.

The volume of the crosslinked blown EVA form may differ in accordance with the expansion ratio and the shape of the internal part of the molding mold, that is, volume of the cavity, design of mix proportion of EVA compound and purposes of the blown EVA form. The volume of the form is 120 to 140% of the final shoe component when the form is used in a secondary compression molding process. The volume of the form is determined by the shape of the cavity of the molding mold which is miniatured in consideration of the volume of the form according to the formability required for the secondary compression re-molding process and changes of physical properties occurring before and after the secondary compression re-molding process, and the expansion ratio of the material.

In cases where the primary compression molded body is shaped into an EVA sponge plate, cut and surface/shape grinded, bonded to the other material and used as a final shoe component, or in cases where the primary compression molded body is used as a final shoe component without performing a secondary compression re-molding process, the form has a size and physical properties which are not stable.

E1) Therefore, the form is cooled for a predetermined time period in the space with no pressure (step SE1). This step is for stabilization of the structure and shape of the individual cell in the form, and volume and physical properties of the form in consideration of the design reference size of the component or product.

The form obtained through the step SE1 is used as a shoe component after performing the processes including a trimming, cutting and bonding, or used as an intermediate form for a compression re-molding process, a secondary process. The intermediate form has a density 60 to 70% or a volume 120 to 140% of the final form, in consideration of the compression re-molding process.

In steps SC1 and SD1, a compression molding machine has a molding part which is selectively maintained at a vacuum state so as to achieve improved flowability and formability of the material. This is to overcome drawbacks of the conventional compression molding method, including a non-uniformity of flow and low formability of the material.

(2) Injection Molding Process

An injection molding process mainly uses a pellet type EVA copolymer, as described with reference to FIG. 1.

A2) A pellet type material is measured and weighed in consideration of the volume of the mold cavity and expansion ratio of the palletized compound. (step SA2).

B2) The material is molten in an injecting machine and injected into the cavity of the injection molding mold along the channel of the molding mold (step SB2).

The subsequent processes include steps SC2 and SE3, explained below. However, in some cases, the material is molten in the injecting machine, injected into the cavity of the warm injection mold that being heated at a very lower temperature, cooled so as to avoid premature reaction of the blowing agent dispersed in the injected compound. and released (step SB12). Subsequently, steps SB1 to SE1 of the compression molding process can be performed for the resultant material.

C2) The molding mold is pressed and heated for a predetermined time period (step SC2).

D2) The molding mold is released and rapidly open (step SD2).

E2) The form is cooled for a predetermined time period in the space with no pressure (step SE2).

Detailed descriptions on steps SD2 and SE2 are identical with the description on steps SD1 and SE1 of the compression molding process.

(1) Heat/Cold Mold Compression Re-molding Process

This process is for producing a final form from the intermediate form obtained from the compression or injection molding process described above.

F1) The intermediate form which has volume 120 to 140% of the final form is compulsorily put into the cavity of the compression molding mold (step SF1).

The cavity of the molding mold is designed to correspond to the size and shape of the final form, and the molding mold is generally made of an aluminum material having a high thermal conductivity.

G1) The molding mold is shut and applied with a predetermined temperature and pressure (step SG1).

H1) The molding mold is cooled and released (step SH1), thereby obtaining a final form.

The heat/cold mold compression re-molding process including steps SF1 to SH1 is for a component with a large thickness, like a midsole, outsole, unitsole and an insole. The heat/cold mold compression re-molding process is widely known as a representative technique of the secondary re-molding process performed in association with the compression molding process and the injection molding process.

The upper component or insole which can be formed of a form having a small thickness and low accuracy of molding, is produced through a cold mold compression re-molding process.

(2) Cold Mold Compression Re-molding Process

F2) The intermediate form is heated by an external heating source, and loaded into the cavity of an open type cold molding die (step SF2).

G2) The material is cold shaped by applying a predetermined pressure through the core of the upper part of the molding mold. (step SG2)

H2) The pressure is released and the cold molded form is released from the molding mold so as to be used as a final form (step SH2).

The EVA crosslinked blown EVA form produced through the first and second processes, by using a hard sheet or pellet, has drawbacks as follows.

First, it is conventional knowledge obtained through bio-mechanical studies and experiments, that shoe sole components for each part of the wearer's foot need differentiated functions. For example, it is desirable to form the lateral side of the rear foot of the wearer from the material having a low hardness or hard material for supporting an arch part, and the fore foot part from the material having a cushioning capability.

In a conventional method, each part of EVA forms compose a sole unit of shoe having different physical properties is independently formed and bonded with each other after formation so as to satisfy the above-described need for differentiated functions.

As shown in FIG. 2, forms A and B are produced through steps S1A to S5A and S1B to S5B, and assembled and bonded in a step S6AB. Alternatively, foam molded forms obtained from the compression or foam molding steps S3A and S3B are assembled with each other in a step S3AB, and compression re-molded in a step S4AB to as to thereby obtain a final form. However, the above-described conventional method has drawbacks with respect to complex manufacturing procedures, high manufacturing costs, and degradation of outer appearance and function including defects in adhesion.

Second, in a conventional method, each shoe part is manufactured independently, assembled and bonded with each other, and painted or printed independently so as to obtain a variety of colors and designs. This causes restrictions in design and deterioration of durability and productivity, while increasing costs.

Third, each shoe part has different physical properties and is manufactured through independent forming and bonding procedures so as to achieve improved abrasion resistance, cushioning, stability and wearing comfort.

Fourth, The shapes of the material used in a conventional method do not allow for a wide range of selection, making it impossible to accomplish a wide variety of functions from each portion of a sole component foamed by crosslinked blown EVA form. That is, it is hard to obtain a final form with light weight, high abrasion resistance and regional multi density design within a single form through the primary foam molding process or the secondary compression re-molding process.

Fifth, use of a conventional sheet or pellet type EVA compound causes increases in manufacturing procedures and costs, preventing diversification of physical properties and design of each part of the form.

Sixth, use of a conventional sheet type EVA compound causes non-uniformity of surface and high variation in thickness, for example 2.5 to 3.0 mm. Therefore, when the sole component is obtained through the primary foam molding process or secondary compression re-molding process, it is hard to obtain quality reproducibility for a mass production. The shape of the sheet type material has to be controlled in X, Y and Z axes, and it is extremely difficult to accurately control the shape in every axes or boundaries of each EVA forms used in different color or physical property within a single form of the component during the foam by either compression or injection molding includes compression re-molding process, to fit the standard of design.

Seventh, a conventional method where the primary compression molded body is shaped into an EVA sponge plate, cut and surface/shape grinded, bonded to the other material and used as a final shoe component, produces significant amount of wastes during cutting and grinding processes.

SUMMARY OF THE INVENTION

Therefore, it is an object of the present invention to provide an EVA based film for crosslinked foam, having a thickness of 0.01 to 2.0, preferably 0.1 to 1.0 mm, and a simplified process for obtaining a single form with one or more physical properties or colors, in consideration of changes of material in each process, so as to manufacture shoe components for a mass production.

Second, it is an object of the present invention to provide a shoe component manufacturing method allowing for differential design/manufacture for each shoe component and improved durability and stability through the diversified physical properties.

Third, it is an object of the present invention to permit, in an effective manner, each shoe component to have different colors and designs, while simplifying decorative processes and improving function of each component, to thereby achieve increased value and quality of the shoe as a final product.

Fourth, it is an object of the present invention to provide a shoe component manufacturing method allowing for improved abrasion resistance, cushioning, deformation resistance, wearing comfort and supporting force.

Fifth, it is an object of the present invention to provide a manufacturing method allowing for a wide variety of colors and designs through a simplified foam molding process for obtaining a form having a unitsole of midsole and outsole.

The manufacturing method permits each shoe component to have different physical properties.

Sixth, it is an object of the present invention to provide a manufacturing method for simplifying shoe component manufacturing procedures and reducing costs by reducing the number of molding molds.

Seventh, it is an object of the present invention to provide a manufacturing method allowing for reduced defective ratio through the simplified and reliable processes for forming components and ease of design and application of properties for a high functional shoe, while achieving components with consistent quality of the shoe component.

Eighth, it is an object of the present invention to provide a manufacturing method allowing for ease of control of components and processes at a lower cost compare to conventional methods.

Ninth, it is an object of the present invention to provide a manufacturing method allowing for ease of manufacture of component having a large thickness, for example, midsole, component having a small thickness, for example, insole, upper or upper component, and component with large and small thicknesses.

Tenth, it is an object of the present invention to provide a manufacturing method allowing for use of not only other foam material or compound, for instance, EVA and other foaming process related ingredient dispersed blown rubber compound or thermoplastic resin but also various kind of conventional materials such as woven and non-woven textile, synthetic leather, natural leather which can be integrated shape with the film type EVA compound through either chemically or physic ally bond each other during or after calendaring process of the form EVA film material.

Eleventh, it is an object of the present invention to provide a manufacturing method allowing for reduction of industrial wastes.

To accomplish the above objects of the present invention, there is provided an EVA based film for crosslinked form in an EVA based composition, wherein the film has a thickness of 0.01 to 2.0 mm, and the EVA based composition consists of EVA based resin, dicumyl peroxide (DCP) as a crosslinking agent, and an inorganic matter as a foaming agent, selected from a group consisting of JTR-M, stearic acid, $MgCO_3$, $TiO_2$, $CaCO_3$ and $ZnO$.

The composition is obtained by a bi-component calender molding process performed before or after a calender molding process, together with a staple fiber, textile fabric, non-fabric, artificial leather, foam rubber compound and/or thermoplastic resin composition.

The film has a thickness of 0.1 to 1.0 mm.

The calender molding process is performed at a low temperature ranging from 30 to 80 degree C.

There is provided a method for manufacturing shoe components using EVA based composition, the method including a first step of cutting an EVA copolymer film having a thickness of 0.01 to 2 mm; a second step of stacking and/or combining the cut films to a cavity of a molding die; a third step of covering the molding die and applying heat and pressure to the molding die; and a fourth step of releasing pressure from the molding die, removing the cover, and producing foam.

There is provided a method for manufacturing shoe components using EVA based composition, the EVA film having a thickness of 0.1 to 1.0 mm.

There is provided a method for manufacturing shoe components using EVA based composition, the film being provided with enhanced physical properties by mixing a staple fiber or textile fabric, non-fabric, artificial leather, foam rubber compound and/or thermoplastic resin composition to the EVA copolymer during manufacturing processes.

In the second step, textile fabric and/or non-fabric, natural/artificial leather and rubber are used together with the film.

Further, there is provided a method for manufacturing shoe components which the film is provided with enhanced physical properties or appearance by bi-component calender molding the film type EVA copolymer with woven fabric or the film having watersoluble polymer; processing the molded material into the tape or wire type material; weaving or knitting the material; and solving the watersoluble polymer.

There is provided a method for manufacturing shoe components using EVA based composition, the film including two or more types which have different physical properties and colors.

There is provided a method for manufacturing shoe components using EVA based composition, the film including two or more types having one or more regular or random pattern and/or characters printed thereon.

There is provided a method for manufacturing shoe components using EVA based composition, the film having a plurality of holes perforated therethrough in a wide variety of shapes or is cut into one or more films.

There is provided a method for manufacturing shoe components using EVA based composition, the films bring stacked and/or combined in the second step, in such a manner that the lateral side of heel or rear foot or arch of mid foot is further hardened as compared other parts so as to achieve increased supporting force, and the medial side of heel or rear foot or center of fore foot has a cushioning capability, elasticity and restoring force relatively higher than those of the lateral side of heel or rear foot or arch of mid foot.

There is provided a method for manufacturing shoe components using EVA based composition, the films being stacked and/or combined in the second step, in such a manner that the part of shoe contacting toes of the wearer has a low hardness and high cushioning capability, and the arch has a supporting force, thus permitting each part of a single form to have different physical properties.

There is provided a method for manufacturing shoe components using EVA based composition, the film being stacked and/or combined in the second step, using a sheet and/or pellet type material or EVA copolymer material which is cooling molded into the state before foam production.

There is provided a method for manufacturing shoe components using EVA based composition, one or more films used in the second step being stacked and/or combined by using an EVA copolymer preform.

There is provided a method for manufacturing shoe components using EVA based composition, the EVA copolymer preform having a stereographic shape.

In film stacking process of the present invention, a film mixed with a pigment or additives for exhibiting colors or visual effects different from the color of the stacked films, is disposed at the top, rear or side surface of the layer of the stacked films.

The method further includes a step of accommodating a structure into the stacked films and removing the structure after a foam molding process so as to form a space in the layer of the stacked films.

The method further includes a step of injecting a film or form passed through the foaming process into a molding die and compression remolding the film or form.

The method further includes a step of mixing a foam thermoplastic resin and/or rubber material with a predetermined portion and/or layer in the second step. and stacking and/or combining the mixture; and a step of bonding shoe components formed of different materials and passed through the compression re-molding process.

The material mixed with the predetermined portion and/or layer in the second step is disposed at the lowest layer in the cavity of the molding die.

The shoe component manufactured by the method of the present invention has an EVA copolymer preform formed integrally with the shoe component.

The preform has a stereographic shape.

The shoe component manufactured by the method of the present invention has a sole with an outermost layer and a subsequent layer. The outermost layer includes a top surface, side surface and a bottom surface of the sole. The outermost layer has perforations or is cut. The subsequent layer is provided with a predetermined color, pattern and/or characters formed integrally therewith. The layer with perforations or which is cut has a rear surface exposed outward.

There is provided a shoe component manufactured by the manufacturing method of the present invention.

DETAILED DESCRIPTION OF THE PRESENT INVENTION

Figure 1:
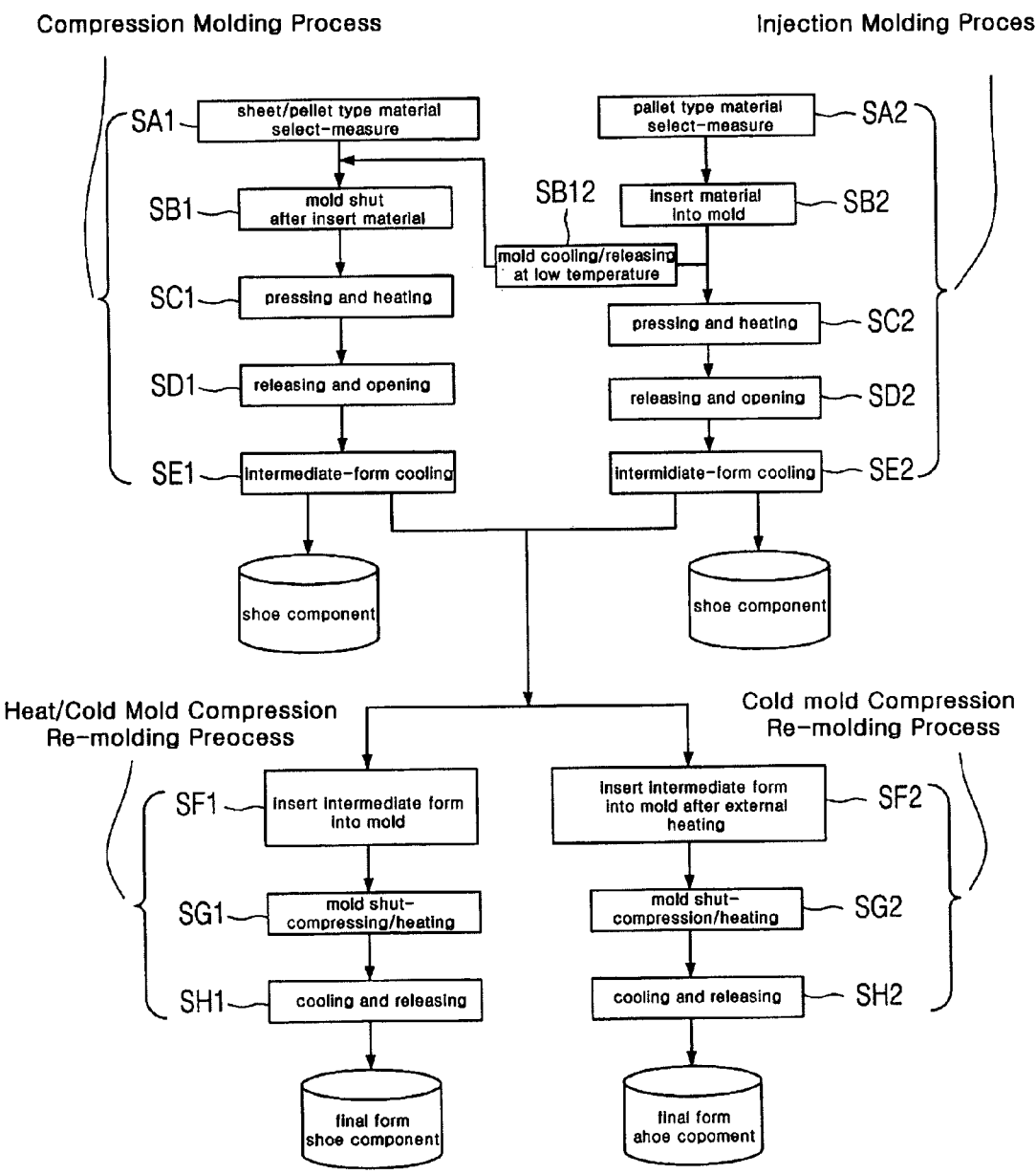
FIG. 1 illustrates primary and secondary molding processes showing a conventional method of manufacturing shoe components using a sheet or pellet type EVA copolymer.
Figure 2:
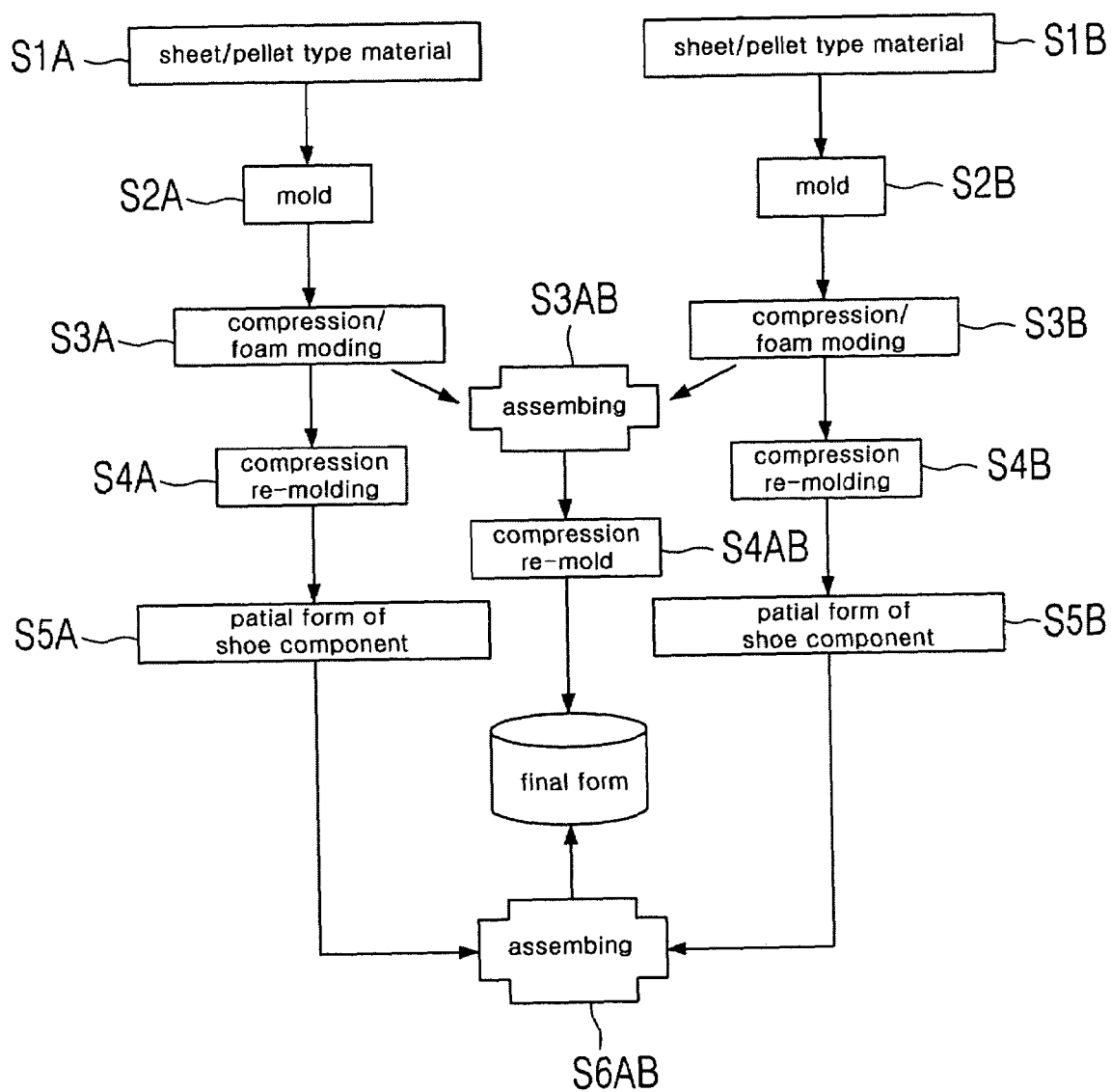
FIG. 2 illustrates a conventional method of manufacturing a shoe component using a sheet or pellet type EVA copolymer, wherein the shoe component is constituted by two parts with different physical properties and colors.

Now, the present invention will be explained in more detail with reference to the attached drawings. In Figures, identical elements bear identical reference numerals and the detailed description on the related arts or configuration will be omitted for clarity of the present invention.

A film having a thickness of 0.01 to 2.0 mm, preferably 0.1 to 1.0 mm, and which is used as a material of an EVA crosslinked form of the present invention has compositions as follows. The film contains, as a main component, EVA resin(melt index (MI) 3.0 g/mm, vinyl acetate (VA) content 22 to 23%, in the following example) which has VA and MI values selected by the purpose and function of product, and a crosslinking or cure agent, foaming or blowing agent, colorant, filer and additives, and various sorts of rubber plolymer, which are added in consideration of the characteristics of the final product and manufacturing processes.

For example 1, a film contains (EVA copolymer as main ingredient)
EVA copolymer (MI 3.0 g/10 min, VA content 22 to 23 weight %); 100 phr
DCP (dicumyl peroxide) as crosslinking agent, purity 98%; 0.66 phr
JTR-M as foaming agent; 1 phr
Stearic acid; 1 phr
ZnO; 1 phr
75Ca-St; 1 phr
$MgCO_3$; 8 phr
$TiO_2$ as colorant; 1 phr For example 2, a film contains (EVA with rubber and another polymer as main ingredient)
EVA copolymer (MI 3.0 g/10 min, VA content 22 to 23 weight %); 50 phr
Ethylene-Butene copolymer 1 (Tafmer 940) 15 phr
Ethylene-Butene copolymer 2 (Tafmer 610); 30 phr
Isoprene Rubber (IR2200); 5 phr
DCP (dicumyl peroxide) as crosslinking agent, purity 98%; 0.78 phr ACDC as foaming agent; 2 phr
TAC as coupling agent; 0.2 phr
Stearic acid; 1 phr
ZnO; 3 phr
Calcium Carbonate; 5 phr
$TiO_2$ as colorant; 4.5 phr The EVA based film for producing crosslinked foam of the present invention is manufactured in a most effective way through a calender molding process for a thin film type. The EVA based film of the present invention can be manufactured consecutively from the end of a conventional manufacturing process of either sheet or pellet type material for a crosslinked EVA form molding.

Materials of the film are primarily mixed through the use of Bumbury or Kneader machine which effectively mixes materials considering characteristics of each material under a mass production environment. The mixed materials are secondarily mixed through the use of an open roll mixing mill which is constituted to fit the work condition, and a pigment, master batch or other additives are added to the mixture.

A conventional EVA based sheet and pellet manufactured through a primary foam molding process has a non-uniform surface, and the non-uniformity has a thickness of 2.5 to 3.0 mm which can be easily discriminated by touch or sight. The sheet type material which is hardened after being cooled in a normal temperature, can be formed into the material for forming a film through the repeated processes performed only several times by the open roll mixing mill.

The pellet type material can be formed into the material for forming a film through the use of a roll mixing mill linked with an extrusion molding process, and processes including cooling, cutting and drying. Thus-obtained material is put into a material injector for performing an injection molding process.

The material of the present invention is obtained through the processes performed in linkage with a roll mixing mill and a precision calender molding process.

After the roll mixing milling, a calender molding process for forming a film type EVA copolymer material is prepared, or a bi-component calender molding process for the film type EVA copolymer and other materials including textile fabric, non-fabric, artificial leather, foam rubber compound and thermoplastic resin is prepared.

In the calender molding process for forming a film type EVA copolymer material, the material passed through the roll mixing mill is applied to an inverse L-shaped four-roll calender. The third and fourth rolls serve to produce thin films having a wide variety of thicknesses, and the temperature rise likely to occur during the calender molding process and in the section of third and fourth rolls needs to be suppressed. Preferably, the temperature is maintained at a low level ranging from 30 to 80 degree C. during the calender molding process so as to suppress production of foam during the processing of the foaming agent dispersed within the film material. The temperature level can vary in accordance with the decomposition start temperature of the foaming agent and the temperature condition for foam molding a form. If the temperature is higher than the above-defined temperature level, form production may occur during the early stage of the film manufacturing process. If the temperature is lower than the above-defined temperature level, the film may be hardened during the early stage of the process, which may cause cracks of the film after being wound or in the post process. The material passed through the calender molding roll is formed into a film-shaped material through the subsequent processes including a cold rolling, trimming, winding and cutting processes. In a bi-component calender molding process, auxiliary rolls for rolling materials including textile fabric and non-fabric integrally with the material of the film are prepared.

The film of the present invention is formed with a high precision, and has a thickness of 0.01 to 2 mm, preferably 0.1 to 1.0 mm. The film of the present invention allows for variety of thickness and extremely small thickness, as compared with the hard plate type sheet or pellet type material which has a thickness of 2.5 mm or higher and a surface non-uniformity easily discriminated by touch or sight. The film of the present invention allows for high uniformity of the surface, such that the variation of roughness of the surface of the film of the present invention cannot be discriminated by touch or sight.

Films with different hardness and/or colors can be manufactured by making the composition ratio between the main component and sub component different. A colorant may be added. Processes of the present invention can be performed prior to the material loading into a cavity of molding mold or prior to the closing of the molding mold for heat and pressure application, which differs from the conventional processes and techniques where only the processes for the material to be injected or loaded into the molding mold are performed, and subsequent processes including a material injection, closing of molding die and application of heat and pressure to the molding die are formed.

In the present invention, films with different properties and colors are prepared so as to allow each part within a shoe component to have different properties, and achieve diversification of design of shoe component. The films are stacked and/or combined into the cavity of the molding mold, and the molding mold is applied with heat and pressure so as to produce foam. This process is simple and economic. Shoe components include an upper component, inner sole, midsole, outsole and a unitsole of midsole and outsole.

Figure 3:
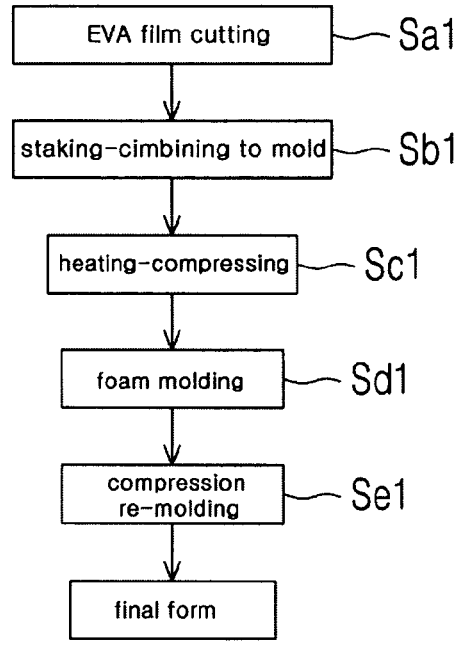
FIG. 3 illustrates a method of manufacturing a shoe component using a film type EVA copolymer according to the present invention.

Now, a compression molding process will be explained with reference to FIG. 3. A plurality of EVA films for crosslinked foam are prepared prior to a compression molding process. The films have same or different properties and/or colors and patterns. The films are cut to fit the cavity of molding mold which is miniatured in accordance with the volume and shape of the final form (step Sa1).

The cut films are stacked and/or combined to the molding mold (step Sb1). The molding mold has a size of 130 to 150% of the final form, and is designed and produced in such a manner that the form can be freely released from the molding mold when foamed. The molding mold has a cavity which is also miniatured in consideration of the volume and shape of the final form. This applies the same to the processing of the large plate type sponge.

The molding mold is applied with a predetermined temperature and pressure (step Sc1), wherein the temperature ranges 140 to 160 degree C. in a compression molding process, and 160 to 170 degree C. in an injection molding process, and the temperature and heating time may change in accordance with the composition ratio of material, size and shape of the molding mold, purpose of the molded article and conditions of machine in the production line. The molding die is released from the pressure and open (step Sd1). The foaming agent is decomposed in the heating process, and high temperature gases including $N_2$ and $CO_2$ contained in the material expand, to thereby produce foam in the molded form. Subsequently, the molded form is trimmed, washed off, cooled and contracted, such that the molded form has stable size, volume and properties.

If the form obtained through the primary compression molding process is to be used in the secondary compression re-molding process, the form is formed to have a volume of 120 to 140% and specific gravity of 60 to 70% of the final form, in consideration of the compression ratio of the secondary compression re-molding process.

The intermediate form is cooled in the space with no pressure and compression re-molded (step Se1). That is, the intermediate form is compulsorily loaded into the molding mold, and the molding mold is closed and applied with pressure and heat. Finally, the molding mold is cooled, and the compression re-molded material is compulsorily stabilized and released from the molding mold, to thereby obtain a final form. This process utilizes characteristics of high degree of crystalline structure of polymer, a common characteristic of EVA, PE or foam rubber, as is widely known.

In the step of cutting the EVA film, the EVA film can be cut to fit the molding mold as described above. Alternatively, the film selected in accordance with the design specification is inserted into the molding mold and cut through the use of elements in the molding die. This in-mold cutting method strengthens positioning of the material in a different color or physical property than rest part of material during preparation of materials for the foam production and it would be another advantage in the present invention.

As described, it is possible to precisely control the material when films have identical property and color. Further, each part of shoe component passed through the primary compression molding process or the secondary compression re-molding process has perfect uniform properties even under the mass production condition. The uniformity of the properties can be obtained through further simple processes in the present invention, as compared with the conventional method.

The manufacturing method of the present invention allows for production of high quality shoe component having a combined design of colors and physical properties in a simple and low cost manner, which is impossible in the conventional technique adopting a primary compression molding process, injection molding process, or a secondary compression re-molding process.

Figure 4:
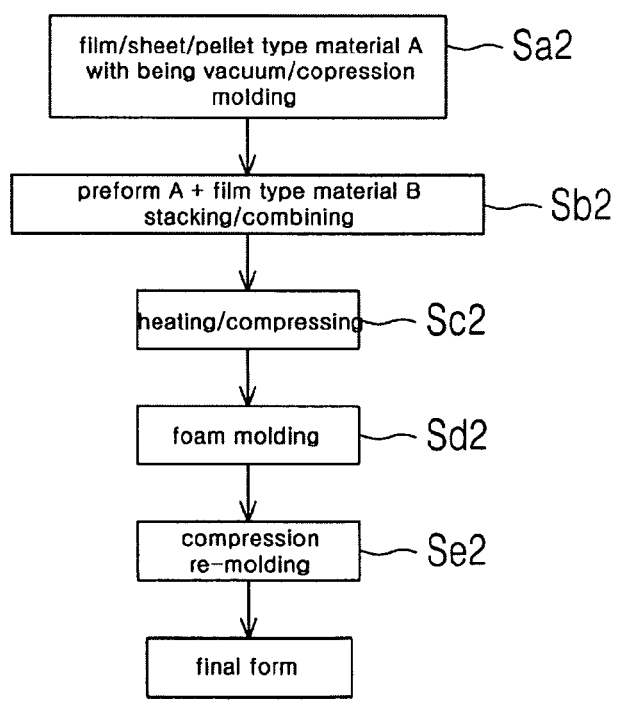
FIG. 4 illustrates a method of manufacturing a shoe component using a film type EVA copolymer and material obtained through a pre-forming process according to the present invention.

As shown in FIG. 4, films with same or different properties and/or design are cut and loaded into the molding mold, and a preform A which is formed through the vacuum or compression molding process by using film type EVA copolymer of the present invention.

The preform A and a film type material B are stacked and/or combined to the molding die (step Sb2). At this time a conventional sheet or pellet type EVA copolymer can be added to the above perform A or film type material B when necessary.

Subsequently, the molding mold is applied with a heat and pressure (step Sc2), and the pressure is released and the molding mold is open, thereby performing a foam molding process (step Sd2). Thus-obtained form is cooled and used as a final component after performing a trimming or washing off process, or cutting, grinding or bonding process. When the form is cooled and used as an intermediate form of a secondary compression re-molding process, the form is compression re-molded (step Se2) and cooled and released from the molding mold, to thereby obtain a desired shoe component. Thus-obtained shoe component has improved cushioning capability, deformation resistance with multi-color and the combination of physical properties.

The EVA based film of the present invention needs X-Y-Z axes control during foam producing (substantially, Z-axis control is not needed due to the thickness of the film), uniformity of shape in the material and variety of thicknesses allow for ease and accuracy of control of shape of foamed form.

The method of manufacturing shoe components according to the present invention allows for ease of achievement of function and design of the shoe component using a conventional sheet type and/or pellet type material. In the step Sb1 or Sb2, part of the shoe component having different physical property uses a film, and the other parts are filled with a conventional material. The pellet type material is molded through a cold injection molding process in which the material is molten in the material injector and injected into the molding mold, the molding mold is not heated and the material is molded without being foamed and released from the molding mold, and thus-obtained form is combined with the film type material of the present invention so as to be used as a material for producing foam.

The method of manufacturing shoe components according to the present invention allows for use of other materials to be added to the EVA copolymer for foam production. Various sort of copolymer (for example, Ethylene-Butene copolymer shown on the formulation example of the above), staple fiber, or proper amount of rubber including natural rubber or isoprene rubber or butadiene rubber or ethylene-propylene rubber can be mixed with the film The material can be linked with a polymer of high degree of crystalline structure, and with textile fabric, non-fabric and other thermoplastic resin as well. It is preferable to add material bonding processes during linking process.

The method of manufacturing shoe components according to the present invention is advantageous in that the form obtained from the primary foam molding process can be uniformly processed and treated, prior to the occurrence of transformation of the forms obtained through the foam molding process (step Sd1 or Sd2) or the compression re-molding process (step S31 or Se2), and the final shoe component. This allows each part of the form to have different colors, properties and functions.

In addition, the method of the present invention allows for design of the material prior to foaming process through the use of conventional design analysis equipment. The material needs to be pre-processed prior to a foaming process, and such a pre-processing can be performed even with respect to the fine part by using the film type EVA copolymer of the present invention.

This significantly differs from the conventional method in that the pre-processing for the material prior to the foaming process cannot be performed and the hard plate sheet or pellet type material only allows for control of the total volume and outer appearance of a form, since the foam molding process of EVA copolymer is characterized as having a continuous change of shape of material in each steps, including a non-uniform sheet/pellet, intermediate form having a volume 120 to 140% of the final molded article, and the compression re-molded final component.

A film containing a main component and a sub component which are mixed at the same ratio is produced, and a film type EVA copolymer material having a thickness of 0.5 mm is prepared, as follows. The film is made up of EVA copolymer.

W1: with white color and hardness shore C 50+/−2 after a primary compression foaming or compression re-molding process The material W1 is cut into each part of the designed shoe component. Subsequently, the materials, for example 10 sheets of cut W1 film, are stacked into a layer and injected into a molding mold.

Figure 5:
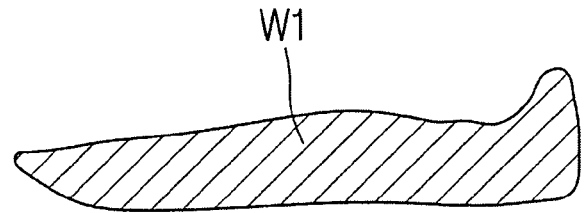
FIG. 5 is a cross section view illustrating a shoe component manufactured by using a film type EVA copolymer according to the 1st embodiment of the present invention.

The form obtained through a compression foaming process is cooled, and trimmed or washed off, without performing a secondary compression re-molding process, so as to be used as a final shoe component. Alternatively, the form is processed into a preform type so as to be used as an intermediate form of the secondary compression re-molding process, or processed into a large plate type sponge and a preform type after performing cutting and grinding processes. The resultant structure is compression re-molded, to thereby obtain the product as shown in FIG. 5.

A film containing a main component and a sub component which are mixed at the different ratio to obtain a final form with the desired shape and property is produced, and a film type EVA copolymer material having a thickness of 0.5 mm is prepared as follows.

1) W1: with white color and hardness shore C 50+/−2 after a primary compression foaming or compression re-molding process 2) B1: with blue color and hardness shore C 65+/−2 after a primary compression foaming or compression re-molding process 3) W2: with white color and hardness shore C 40+/−2 after a primary compression foaming or compression re-molding process Materials W1, B1 and W2 are cut into each part of the designed shoe component. Subsequently, the materials, for example 1 sheet of W1 film, 1 sheet of B1 film, and 3 sheets of W2 film, are stacked into a layer and injected into a molding die.

Figure 6A:
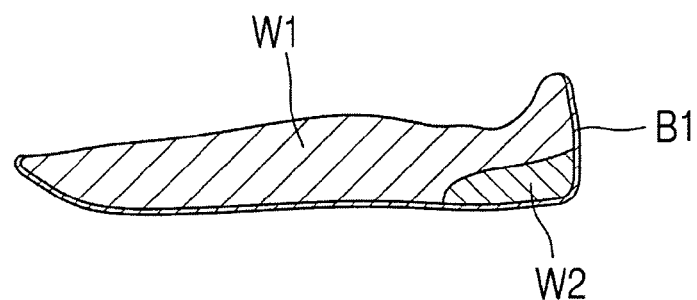
FIGS. 6a to 6e are cross section views illustrating shoe components manufactured by using a film type EVA copolymer and which have different colors and physical properties according to the 2nd embodiment of the present invention.
Figure 6B:
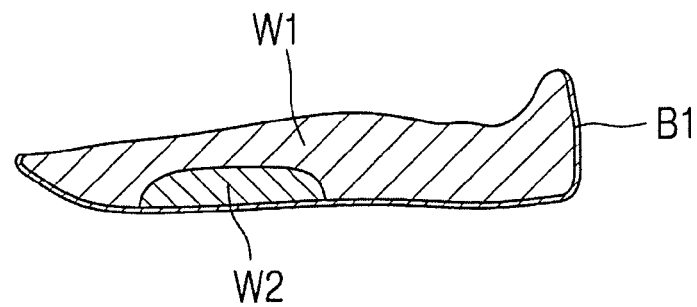
Figure 6C:
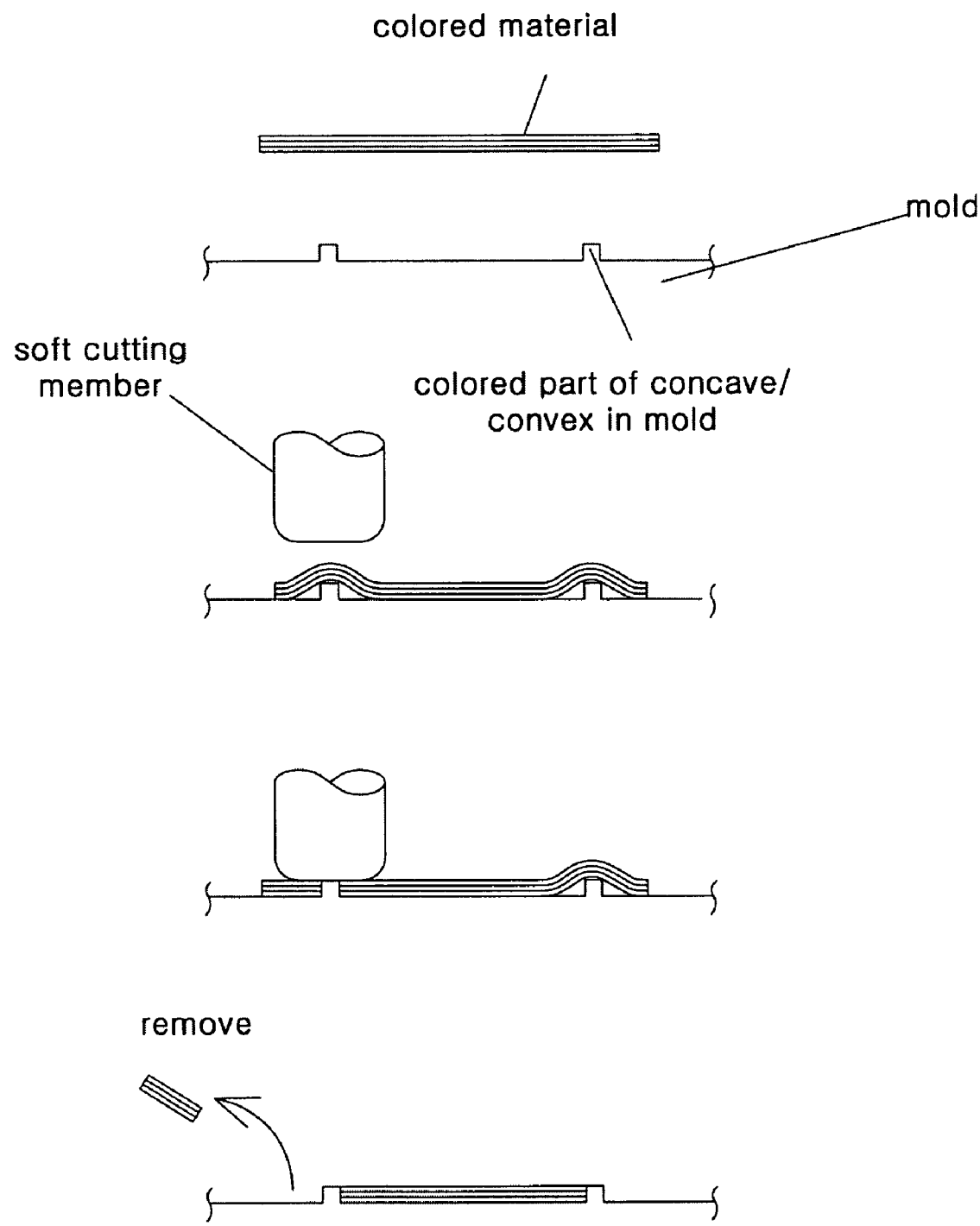

The form obtained through the compression foaming process is cooled, and trimmed or washed off without performing a secondary compression re-molding process, so as to be used as a final shoe component. Alternatively, the form is used as an intermediate form of the secondary compression re-molding process, to thereby obtain a shoe midsole having three parts with different properties and colors, as shown in FIGS. 6a and 6b. The shoe sole shown in FIG. 6a is provided with improved cushioning capability in the part contacting the heel of foot of the wearer. The shoe sole shown in FIG. 6b is provided with improved cushioning capability in the fore part of the sole, so as to thereby reduce foot fatigue.

Figure 6D:
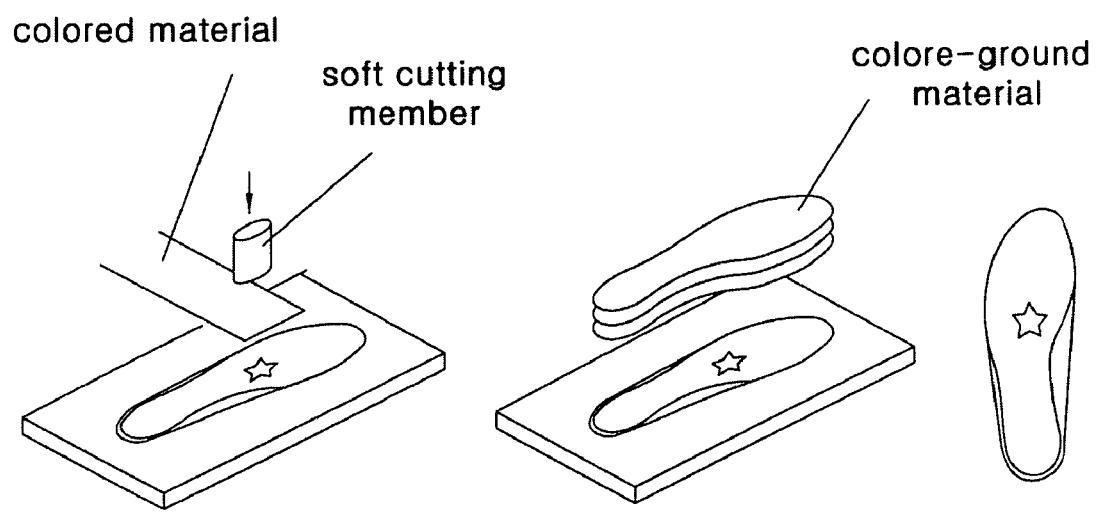
Figure 6E:
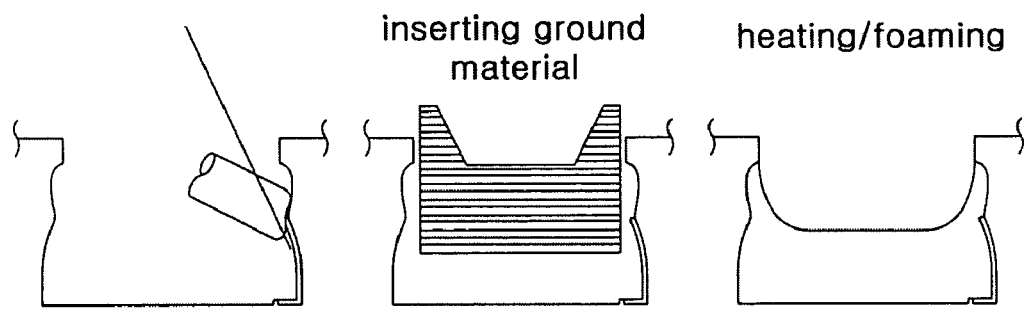

In embodiment 2, films are cut, stacked and loaded into the molding mold. However, films can be cut within the molding mold by using the color separator arranged within the cavity of the molding mold, through a material cutting molding method. This method overcomes the drawbacks related to the position correction of material. To apply the material cutting molding method, the inner or outer part of the edge of the recessed or raised boundary of part design on the bottom or side surface of the cavity of the molding mold is filled with a film. In embodiment 2, one or more edges are filled with films with different colors and properties before the rest part of material fill the cavity, and a foam molding is performed, to thereby obtain shoe components having a wide variety of designs in an effective manner. These processes are shown in FIGS. 6d to 6e.

To manufacture a shoe insole having a thickness relatively smaller than the thickness of the midsole, heel or rear foot and the fore foot at the ¾ from the heel have low hardness to cushion an impact, and the arch has a supporting force.

1) W3: with white color and hardness shore C 30+/−2 after a primary compression foaming or compression re-molding process 2) R1: with red color and hardness shore C 25+/−2 after a primary compression foaming or compression re-molding process: disposed at the center between the heel and fore foot.

3) B2: with blue color and hardness shore C 40+/−2 after a primary compression foaming or compression re-molding process: disposed at the arch.

Figure 7:
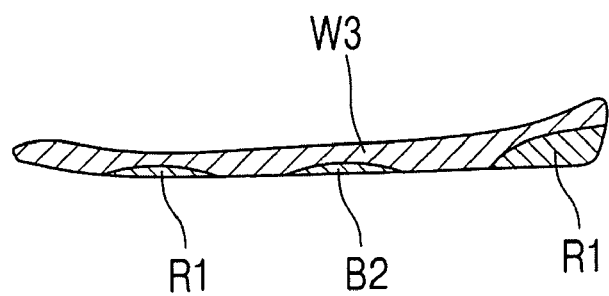
FIG. 7 is a cross section view illustrating shoe insoles manufactured by using a film type EVA copolymer and which have different colors and physical properties according to the 3rd embodiment of the present invention.

Materials W3, R1 and B2 are cut into each part of the designed shoe component. Subsequently, the materials, for example 2 sheets of W3 film, 2 sheets of R1 film, and 1 sheet of B2 film, are stacked into a layer and injected into a molding die. The processes same with the processes of Embodiment 1 are performed, and the cold molding compression re-molding process can be performed. Thus-obtained shoe insole as shown in FIG. 7 has superior cushioning capability, allowing for application to the conventional shoe.

In manufacturing shoe components according to the method of Embodiment 2, a preform (W3) obtained through the preforming process including a cold press process and a vacuum molding process and which has a three-dimensional shape can be used for the part of the shoe component requiring specific physical properties or color.

Figure 8A:
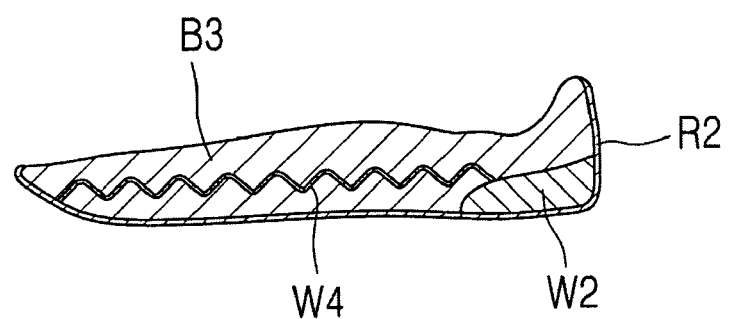
FIGS. 8a and 8b are cross section views illustrating shoe components manufactured by using a film type EVA copolymer and waveform preform according to the 4th embodiment of the present invention.
Figure 8B:
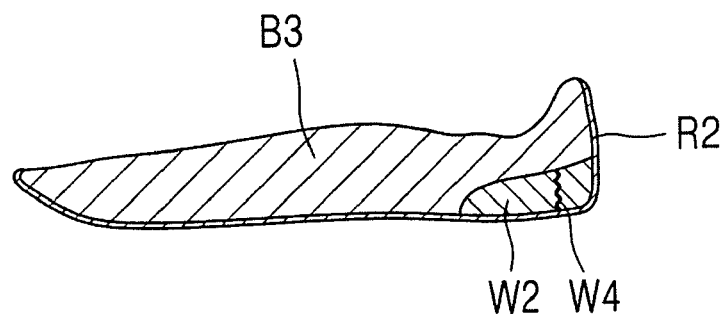

1) W4: with white color, waveform and hardness shore C 55+/−2 after a primary compression foaming or compression re-molding process 2) W2: with white color and hardness shore C 40+/−2 after a primary compression foaming or compression re-molding process 3) B3: with blue color and hardness shore C 50+/−2 after a primary compression foaming or compression re-molding process 4) R2: with red color and hardness shore C 65+/2 after a primary compression foaming or compression re-molding process Materials, for example, 1 sheet of W4 film, 6 sheets of B3 film, 3 sheets of W2 film, and 1 sheet of R2 film are stacked into a layer and loaded into a molding mold. The form obtained through a compression molding process is cooled, and trimmed or washed off without performing a secondary compression re-molding process, so as to be used as a final shoe component. Alternatively, the form is processed into a preform type so as to be used as an intermediate form of the secondary compression re-molding process, as described in Embodiment 1. The material W3 can be loaded into the molding mold in a horizontal or vertical direction. This is shown in FIGS. 8a and 8b.

In Embodiment 5, a unitsole of midsole and outsole will be manufactured using EVA based rubber by mixing certain amount of rubber into the EVA compound as a material for the outsole.

Figure 9:
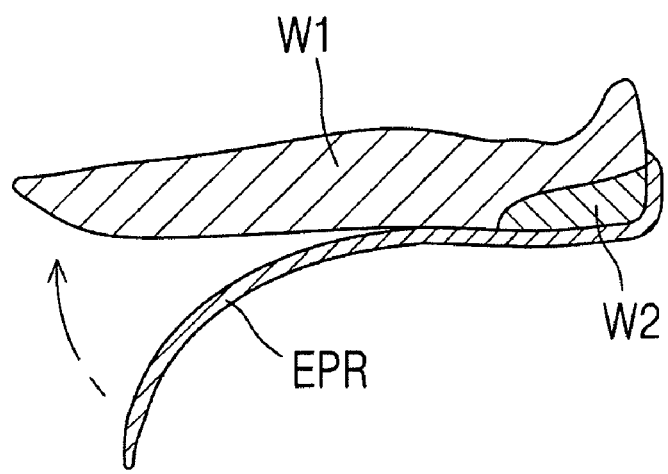
FIG. 9 is a cross section view illustrating a unitsole of a midsole and outsole manufactured by using an EVA resin film and foam rubber according to the 5th embodiment of the present invention.

1) W1: with white color and hardness shore C 50+/−2 after a primary compression foaming or compression re-molding process 2) W2: with white color and hardness shore C 40+/−2 after a primary compression foaming or compression re-molding process 3) EPR: with black color, and which is made up of EVA based Butadiene foam rubber Materials W1, W2 and EPR are cut into each part of the designed shoe component. Subsequently, the materials, for example 7 sheets of W1 film, 3 sheets of W2 film, and 1 sheet of EPR film, are stacked into a layer and loaded into a molding mold. This process is called a mixed stacking-combining process where different materials are stacked together. The subsequent processes are the same with the processes of Embodiment 2. In the cases the EVA resin layer and the EPR layer are not crosslinked with each other after form molding process due to difference of each formulation, they need to be bonded with each other. Thus-obtained shoe component is shown in FIG. 9.

Figure 10A:
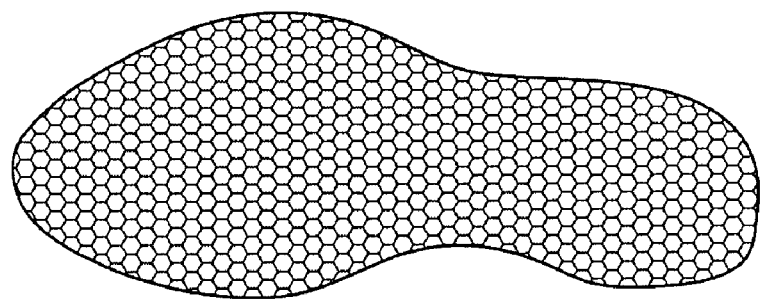
FIGS. 10a to 10c are rear views of a shoe component manufactured by a perforated and printed film type EVA copolymer or rubber according to the 6th embodiment of the present invention.
Figure 10B:
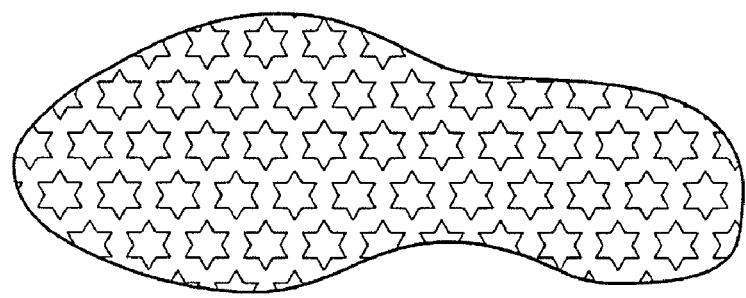
Figure 10C:
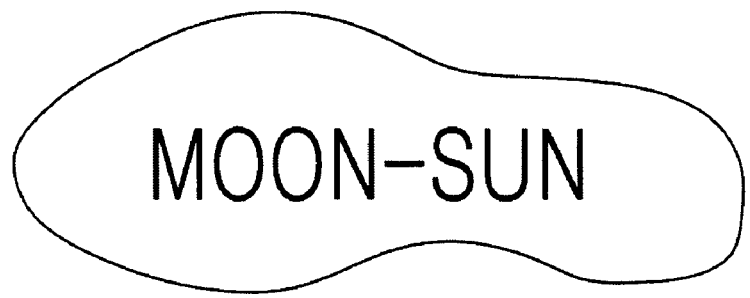

In the stacking-combining process in Embodiment 1, 2 or 4, a film with perforations is disposed at the lowest layer of the molding mold, and a film with different color or design is disposed partially on or all over the lowest layer, to thereby obtain, in an effective way, a shoe component with aesthetic enhancement. Preferably, the lowest layer is formed of a film made up of EVA copolymer with an abrasion resistance. This process is shown in FIGS. 10a to 10c.

Figure 11A:
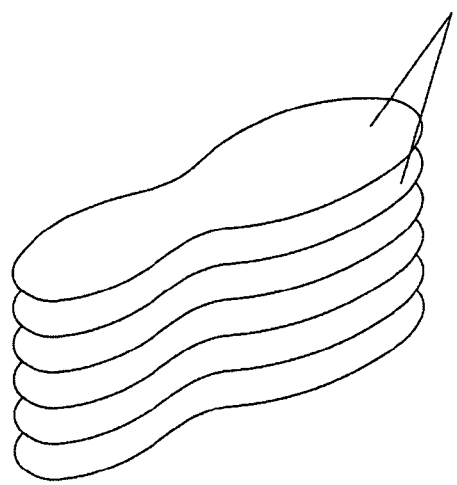
FIGS. 11a and 11b illustrate a shoe component according to the 7th embodiment of the present invention.
Figure 11B:
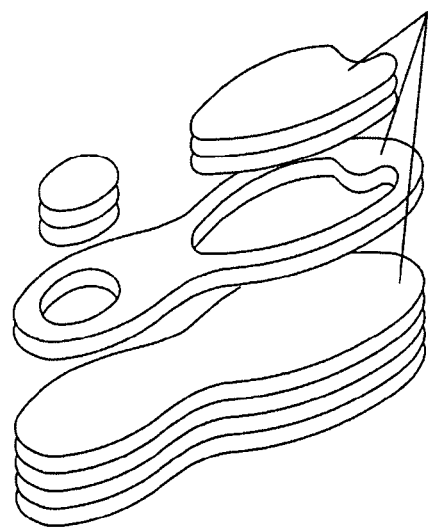

A film type material is cut to fit the shape or structure required for a product, combined, stacked and injected into a molding mold. FIG. 11a illustrates a film type material which is cut in consideration of color, and FIG. 11b illustrates a film type material which is cut in consideration of color or shape. Other processes are the same with the above-described processes, and detailed description thereof will be omitted.

Figure 12:
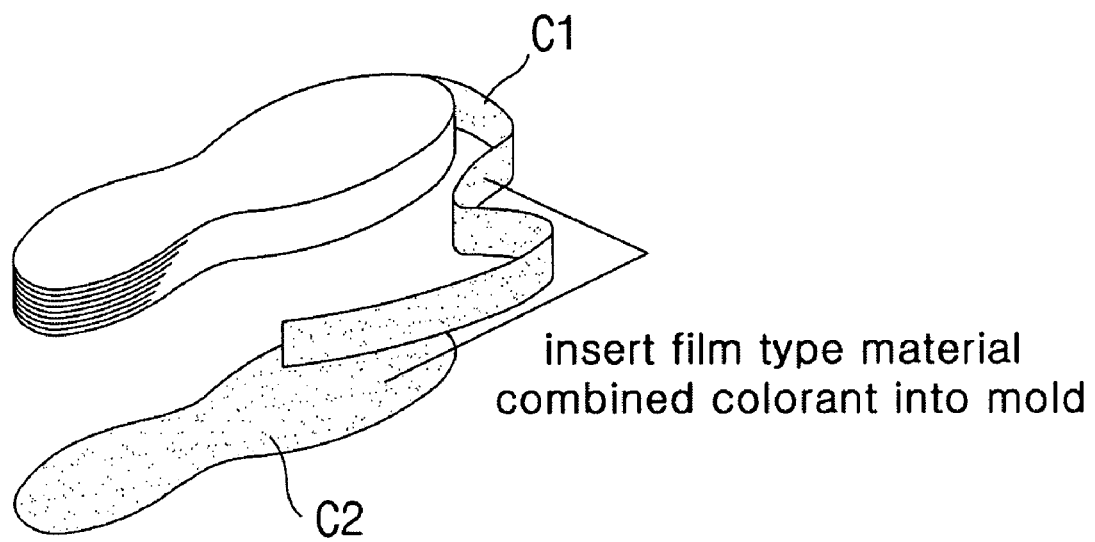
FIG. 12 is a cross section view illustrating a shoe component according to the 8th embodiment of the present invention.
Figure 13A:
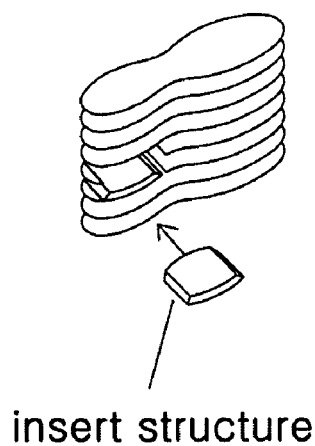
FIGS. 13a to 13d are cross section views illustrating a shoe component according to the 9th embodiment of the present invention.
Figure 13B:
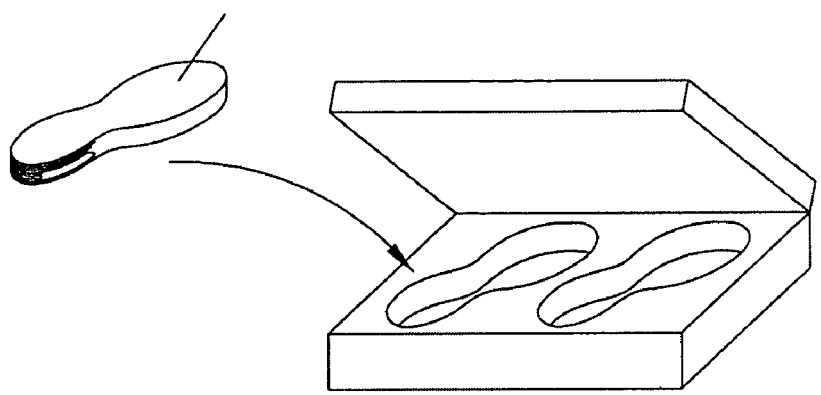
Figure 13C:
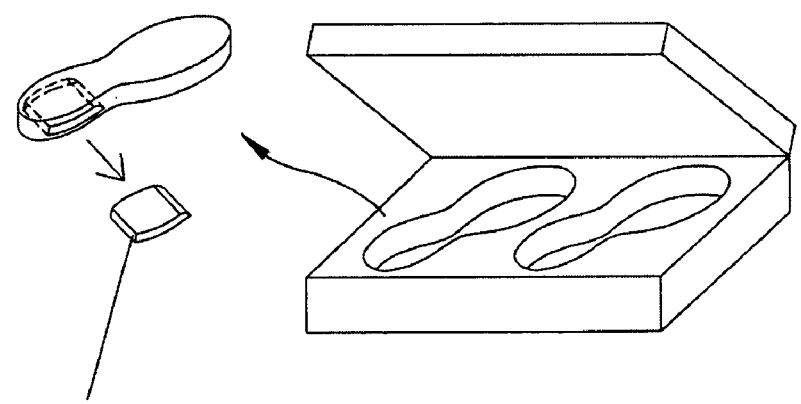
Figure 13D:
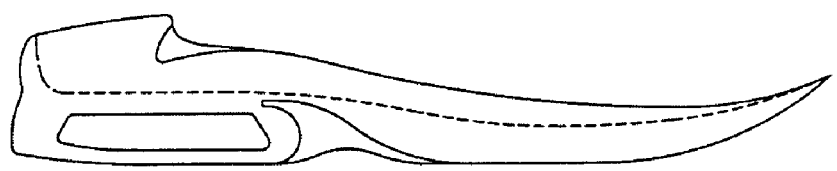

FIG. 12 illustrates a shoe component according to an embodiment of the present invention, where a form exhibits a wide variety of visual effects by mixing the pigment for expressing the desired texture and color to the material to be deposited at the top. The film type material (C1 or C2) mixed with the pigment is combined with the top or bottom surface or side surface or back side of partially opened surface layer, and accommodated into a molding mold. Other processes are the same with the above-described processes, and detailed description thereof will be omitted.

In case where a hole or space at a product is required in the aspect of function, structure or design, a structure formed of a heat resistant material is inserted into the desired position during stacking of film type EVA materials. The structure is removed after completion of molding, to thereby ensure the space in the form.

This process is shown in FIGS. 13a to 13d. A lightweight structure formed of a heat resistant material and which allows for ease of separation from the form, is inserted into the layer formed by stacking films. The structure is combined with the main material, and place in the cavity of the molding mold. The resultant structure is heated, pressed and foam produced, and separated from the form after completion of foam producing process. This allows for formation of inner surface of the form and outer surface as well. As a result, a shoe component with a form having a variety of inner and outer surfaces is obtained in an effective manner. Thus-ensured space can be utilized as a space for accommodating functional parts including injection molding component or others.

Figure 14A:
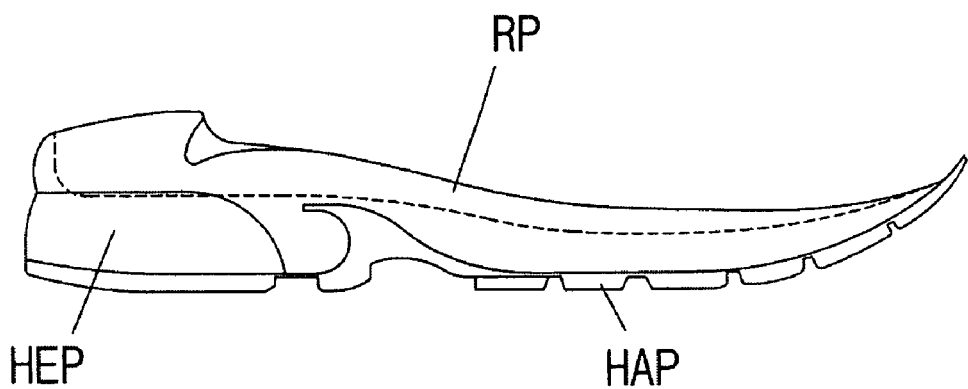
FIGS. 14a to 14c are cross section views illustrating a shoe component according to the 10th embodiment of the present invention.
Figure 14B:
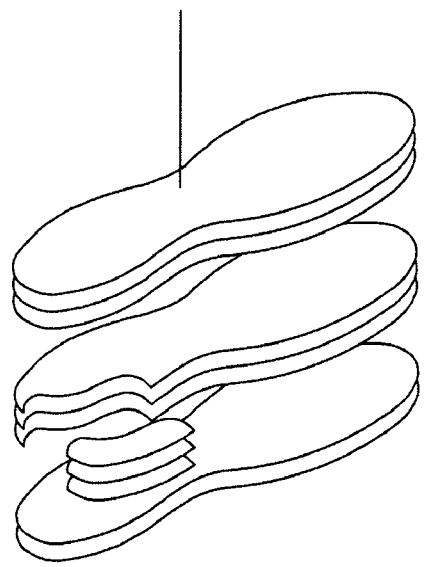
Figure 14C:
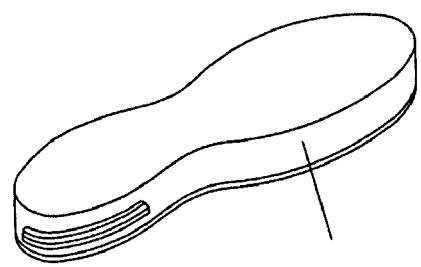

Embodiment 10 is a modification of Embodiment 5. At least two different grade film type materials for a single crosslinked foam having two or more physical properties including density and abrasion is cut, combined and stacked and then completed a single unit material before foam molding process. After foam molding, the form is molded into a single unit, avoiding bonding of each part of molded articles. The components are as follows;

1) RP (general film type EVA based composition for crosslinked foam): hardness shore C 60+/−2 after re-compression 2) HEP (high elastic film type EVA based composition for crosslinked foam): hardness shore C 45+/−2 after re-compression 3) HAP (high abrasion resistant film type EVA based composition for crosslinked foam): abrasion 135+/−2 after re-compression FIGS. 14a to 14c illustrates Embodiment 10. Other processes are the same with the above-described processes, and detailed description thereof will be omitted.

Figure 15A:
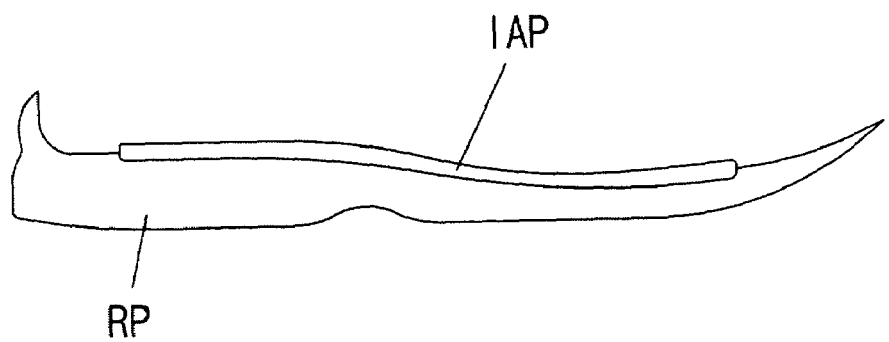
FIGS. 15a to 15c are cross section views illustrating a shoe component according to the 11th embodiment of the present invention.
Figure 15B:
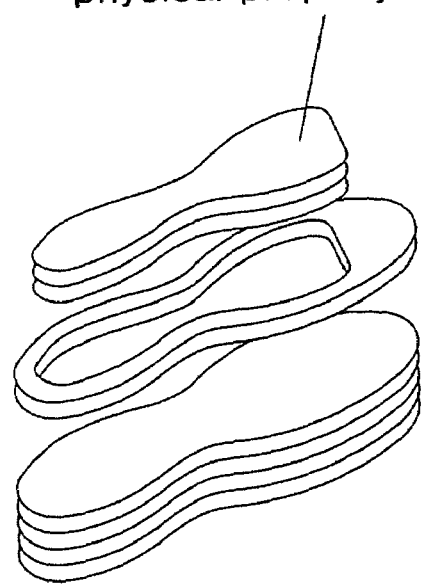
Figure 15C:
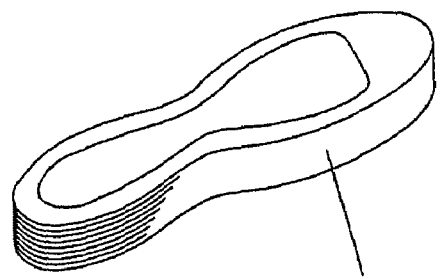

Embodiment 11 is a modification of Embodiment 10 and shown in FIGS. 15a to 15c.

The components are as follows;

1) RP (general film type EVA based composition for crosslinked foam): hardness shore C 60+/−2 after re-compression 2) IAP (cushioning film type EVA based composition for crosslinked foam): hardness shore C 45+/−2 after re-compression Other processes are the same with the above-described processes, and detailed description thereof will be omitted.

Figure 16A:
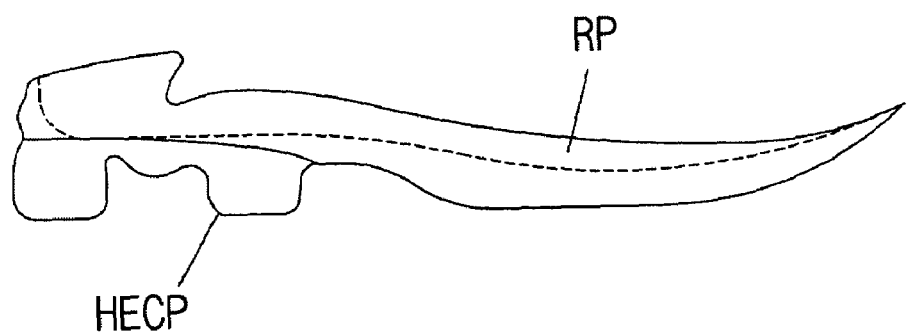
FIGS. 16a to 16c are cross section views illustrating a shoe component according to the 12th embodiment of the present invention.
Figure 16B:
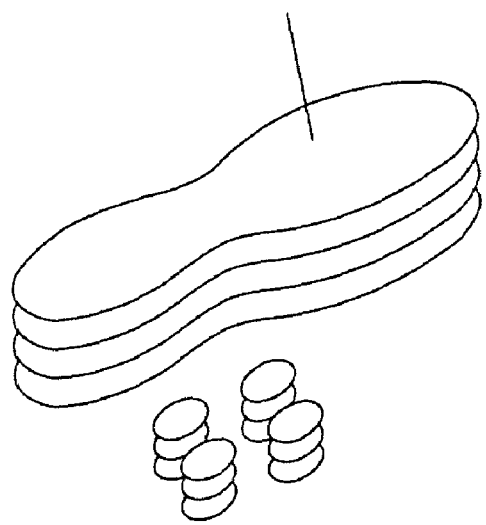
Figure 16C:
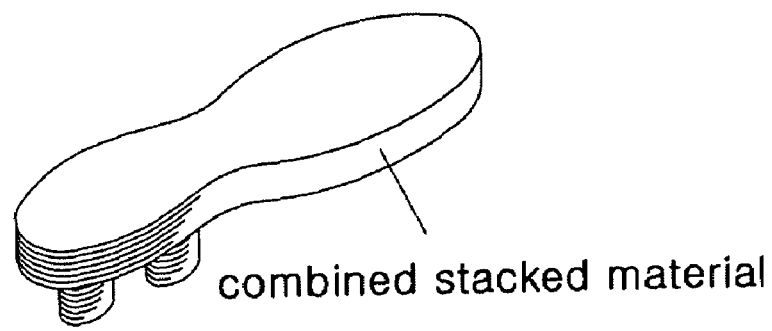

Embodiment 12 is a modification of Embodiment 10 and shown in FIGS. 16a to 16c.

The components are as follows;

1) RP (general film type EVA based composition for crosslinked foam for use of midsole): hardness shore C 60+/−2 after re-compression 2) HECP (high elastic film type EVA based composition for crosslinked foam for use of cushion material): hardness shore C 45+/−2 after re-compression In Embodiment 12, a product is provided with a cushioning capability which cannot be easily accomplished through the compression molding method for general EVA based composition, to thereby allow the product to function as an air bag. Other processes are the same with the above-described processes, and detailed description thereof will be omitted.

Figure 17A:
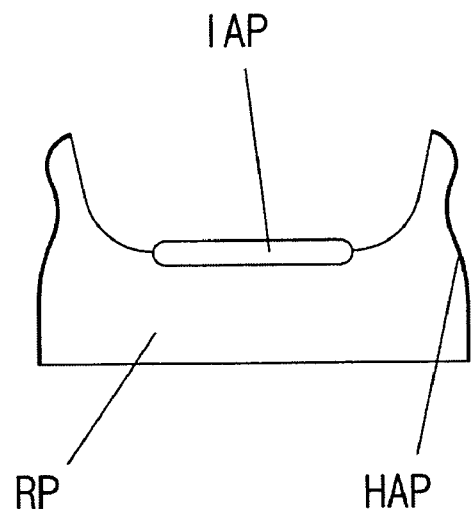
FIGS. 17a and 17b are cross section views illustrating a shoe component according to the 13th embodiment of the present invention.
Figure 17B:
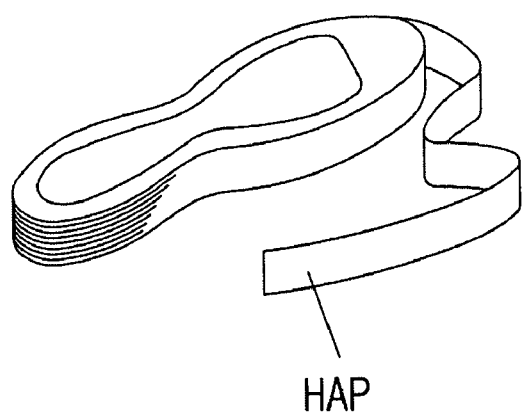

Embodiment 13 shown in FIGS. 17a and 17b is characterized in that the abrasion resistance of the side surface of the form is enhanced by adding a high abrasion resistant film lapping process to the procedures of Embodiment 11 for improving properties of the outside of the foam and appearance contrary to the onside of the foam. This can be accomplished by permitting a film type high abrasion resistant EVA material (HAP) to be arranged along the circumference of the material stacked in consideration of the size of the product, and inserting the resultant structure into a molding mold.

Figure 18A:
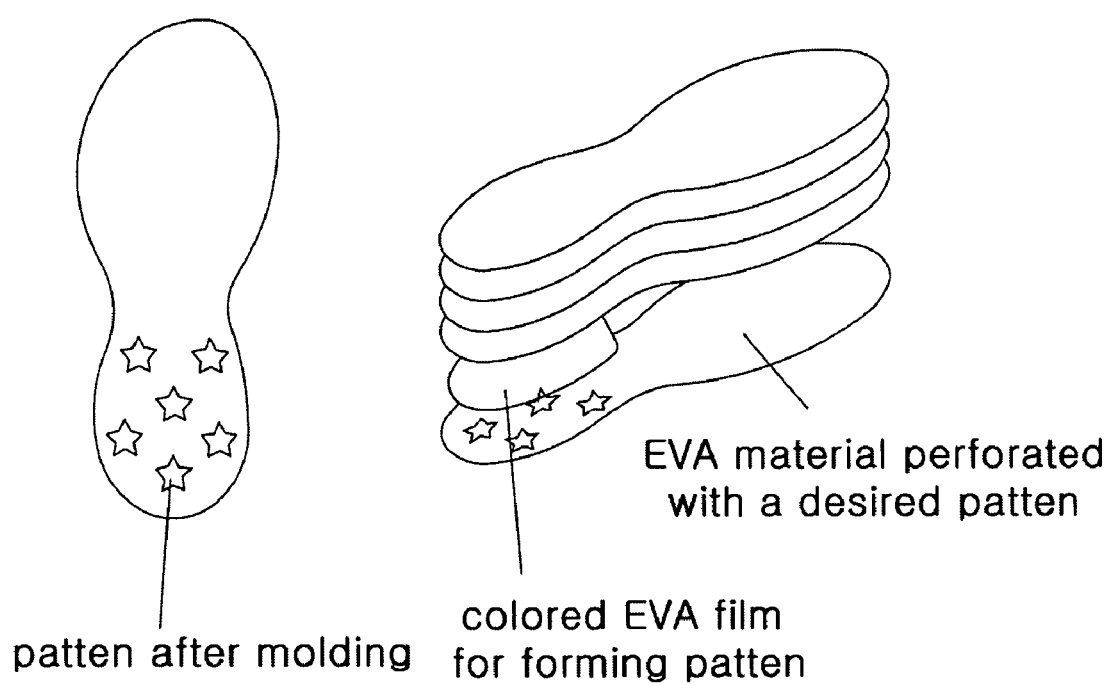
FIGS. 18a and 18b are cross section views illustrating a shoe component according to the 14th embodiment of the present invention.
Figure 18B:
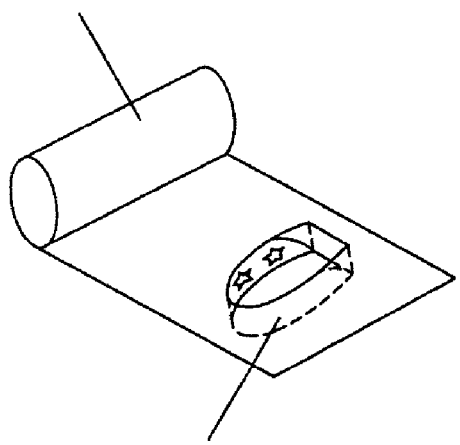
Figure 18B:
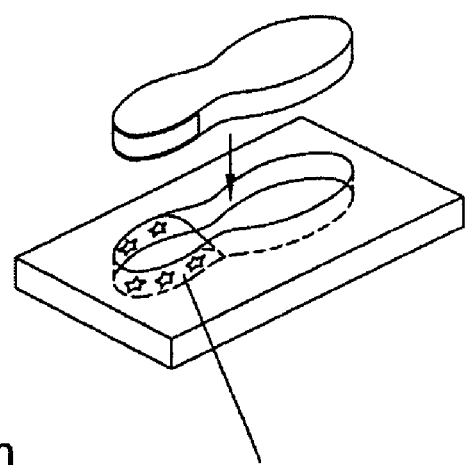
Figure 19A:
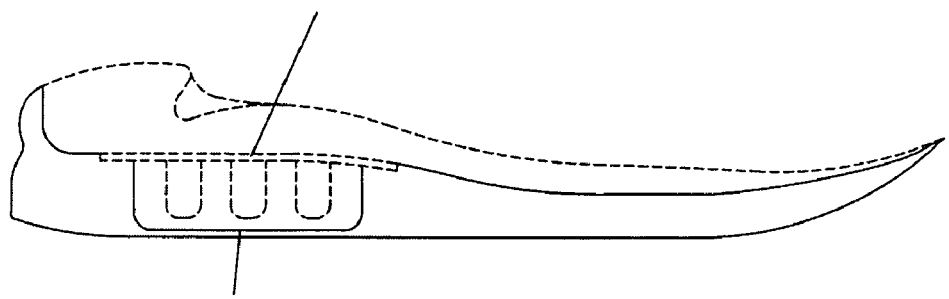
FIGS. 19a to 19d are cross section views illustrating a shoe component according to the 15th embodiment of the present invention.
Figure 19A:
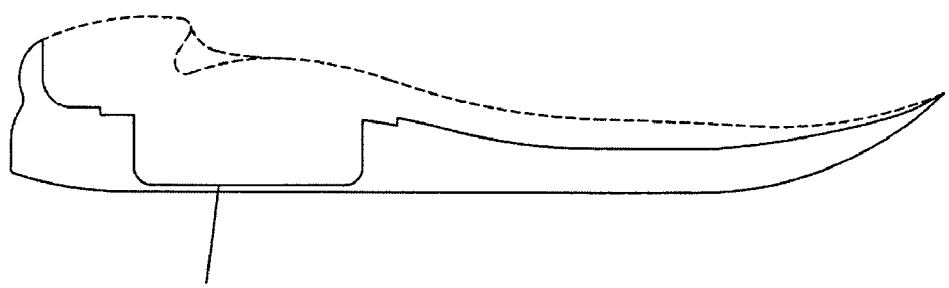
Figure 19A:
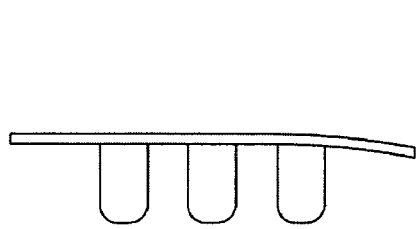
Figure 19A:
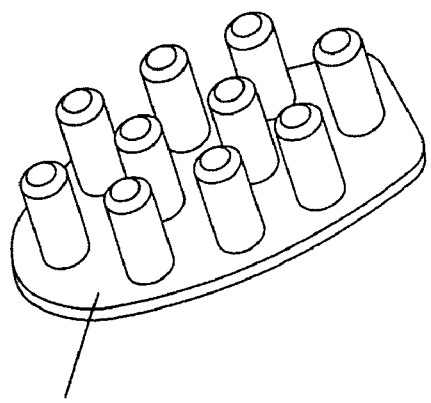
Figure 19B:
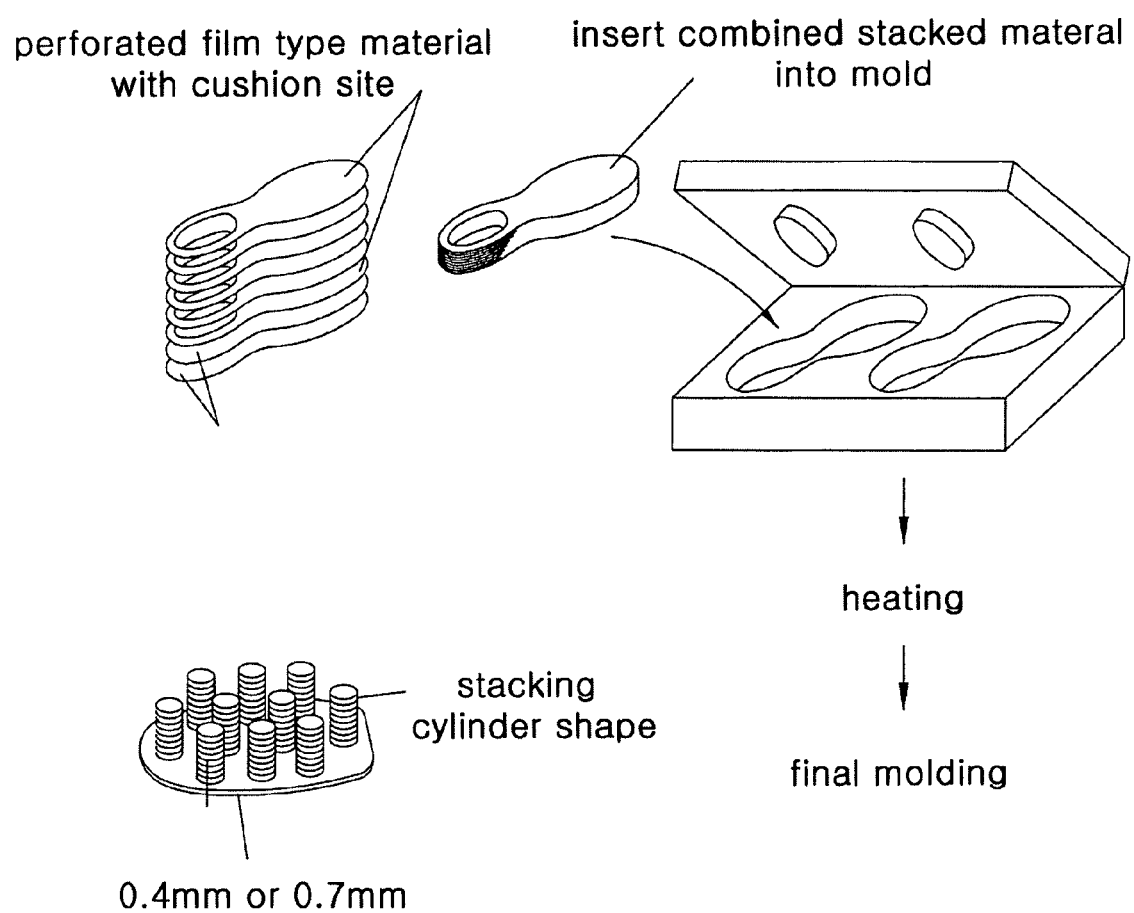
Figure 19C:
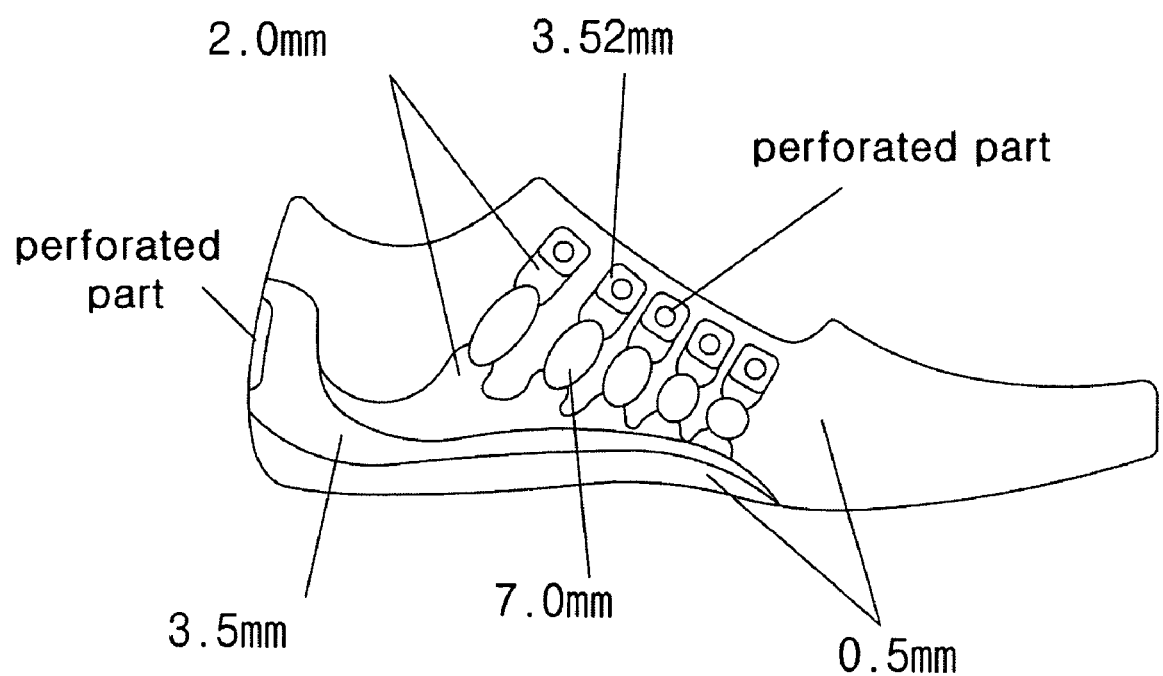
Figure 19D:
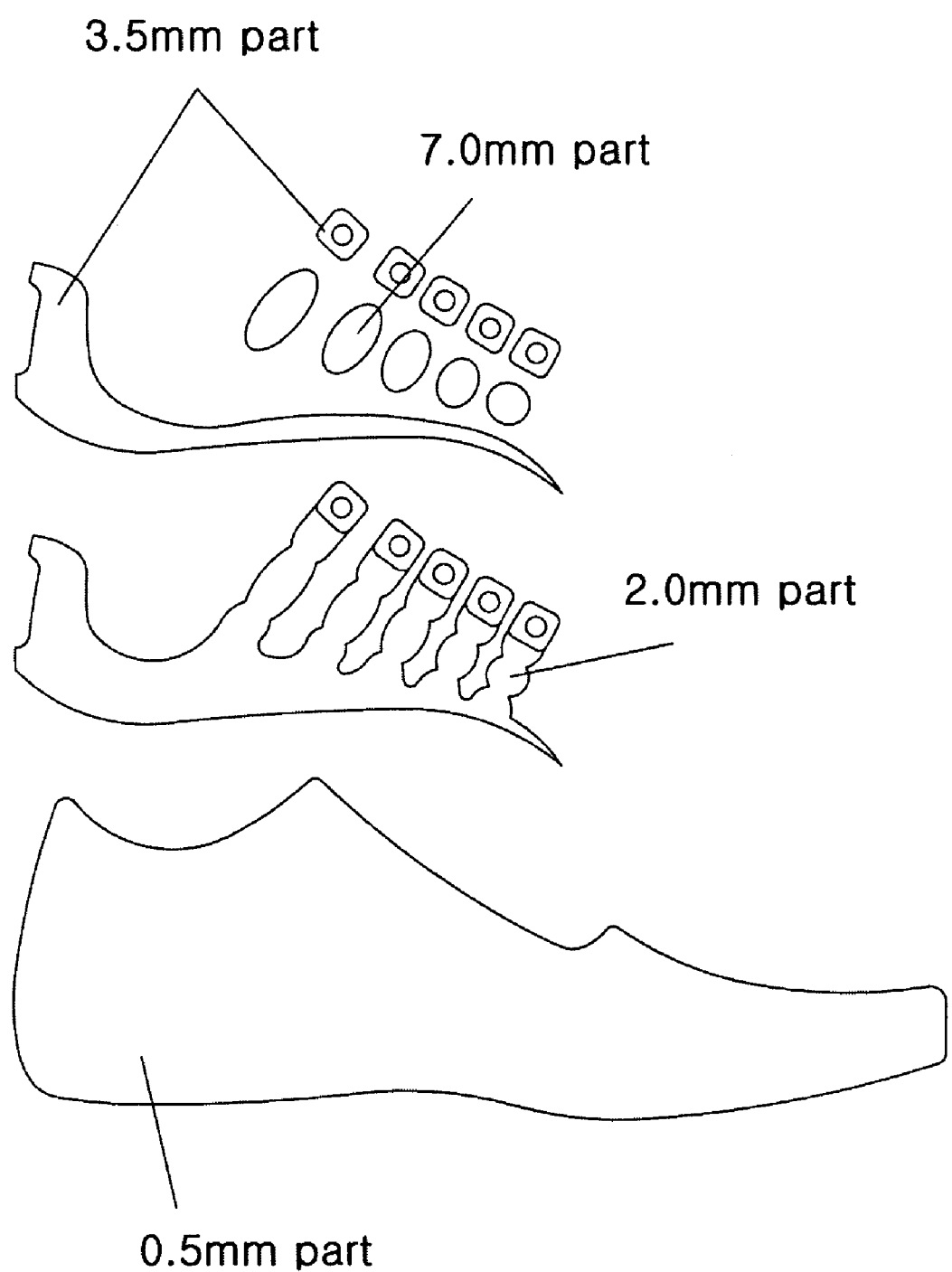

Embodiment 14 shown in FIGS. 18a and 18b is a modification of Embodiment 6. A flat film type material is processed into a preform having a stereographic shape through a molding process, and the preform is perforated with a desired pattern. In detail, a roll milled film type material is preformed into a product shape through the processes including a vacuum suction or molding, and thus-obtained preform is perforated with a desired pattern. The resultant structure is accommodated into a molding die. Subsequently, a pattern forming material is inserted into a bottom material. Other processes are the same with the above-described processes, and detailed description thereof will be omitted. Embodiment 14 also permits a combination of a pattern perforation material and a bottom material, and insertion of the resultant structure into a molding die. The method described with reference to Embodiment 14 is appropriate for the case where a need exists for formation of a pattern at the accurate position of the side surface or curved surface of the product.

Embodiment 15 can be applied to the case where a form has both a thin part and a thick part which are formed integrally in a single same form, and the case where a form has an overall small thickness and partially large thickness, for example, an upper of a shoe having an overall thickness of 1.0 mm and a specific part with a thickness of approximately 10.0 mm, or a midsole of a shoe having a fore foot area with a thickness of 15 mm, heel area with a thickness of 25 mm and a specific part with a thickness of approximately 1.0 mm.

In cases where the form has a significant high variation in its thickness, a conventional compression foaming or injection foaming process has drawbacks in that a material is concentrated at the large thickness part, causing fractures at the small thickness part when a sheet type material is used, or flow of the material is easily cut due to the insufficiency of space in a molding die, causing a high defective ratio in a mass production when a pellet type material is used.

To obtain a form with a thickness of 1.0 mm, it is required that the molten material flows into the space of the cavity of the molding die, wherein the space has a width of approximately 0.7 mm. In addition, the conventional material does not allow ease of filling the thick part with a large amount of material.

In Embodiment 15, a film which is capable of integrally accommodating a thin part and a thick part is cut or preformed into a thickness of approximately 0.7 mm so as to form a minimum thickness part during a foam molding process. The cut films are stacked-combined, injected into a molding die, applied with heat and pressure and foam molded.

These processes and a result therefrom are shown in FIGS. 19a to 19d, and a shoe component with a significant large variation of thicknesses in a single foamed form can be obtained in an effective manner through a single foam molding process.

Embodiment 16 is a process of producing a form by using the material obtained through the process of bi-component calender molding the film type material integrally with the film type EVA copolymer and other materials including a textile fabric, non-woven fabric, artificial leather, foam rubber compound and thermoplastic resin composition. This embodiment allows for a wide variety of physical properties and colors for each surface of the form.

The film type EVA copolymer is processed into the width of 40 inches and thickness of 0.5 m/m, and bi-component calender molded selectively with the non-woven fabric with the width of 40 inches and thickness of 0.5 m/m which is produced from the staple fiber having a PVA (poly vinyl alcohol) finess 0.7 to 1.0 denier, or the film material of PVA width 40 inches and thickness of 0.3 m/m. The film type EVA copolymer and the selected material are integrated with each other through the physical coupling process. The resultant material is processed into the tape or wire type material.

The EVA copolymer and film or non-fabric material are integrally bi-component calender molded so as to prevent the thin film type EVA copolymer material from being expanded during production of the material for form. The bi-component calender molding process can be performed selectively in accordance with the difference of thicknesses of the film type EVA copolymer material. Thus-obtained textile type EVA copolymer material is dipped into the water of 10 to 30 degree C. for a predetermined time period, so as to thereby solve the non-woven fabric or film having water soluble poly vinyl alcohol components. This allows the textile type EVA copolymer material to expand during the foam process, without being interfered with the non-woven fabric or film having water soluble poly vinyl alcohol components. The resultant structure is dried and processed through the steps of the above-described embodiments, to thereby produce a single EVA form having a wide variety of color arrangements and outer apperance. Other processes are the same with the above-described processes, and detailed description thereof will be omitted.

As described above, an EVA based film of the present invention has a wide variety of thicknesses of 0.01 to 2 mm, preferably 0.1 to 1.0 mm. The film has a uniform surface, with a surface roughness variation which may not allow for discrimination through touch or sight. This allows for a pre-process of the material so as to obtain a wide variety of designs. The pre-processed or preformed material is uniformly distributed during a foam molding process due to the characteristics of the film type. Therefore, a method for manufacturing shoe components of the present invention allows for a simplified process capable of controlling even the fine parts of the shoe component.

The part of the shoe component contacting a specific part of the foot of the wearer is provided with the required physical properties through the simplified process, to thereby achieve improved quality reliability and durability of the final form.

A wide variety of colors, patterns and characters are applied to the shoe component at a low cost.

A shoe manufactured through the simplified process of the present invention is provided with enhanced cushioning capability, abrasion resistance, elasticity, flexibility, deformation resistance, and supporting force in an easy and low cost manner.

In cases where a midsole and an outsole need to be formed into a single unit, or a high hardness part and a low hardness part need to be partitioned in a single form, a single integrated component satisfying these conditions can be obtained through the simplified process without adding other components.

A method of the present invention allows for reduction in manufacturing costs through the simplified manufacturing procedures and reduced number of molding dies.

A method of the present invention allows for reduction of defective ratio through the simplified and reliable procedures, and improved stability for a mass production environment.

A method of the present invention allows for ease of accomplishment of mechanical properties, functionality, colors and design.

A method of the present invention allows for ease of accomplishment of the above-described effects even on the component having a small thickness, and diversification of uses of form as a material for a bottom or an upper of a shoe component.

A method of the present invention allows for environment-friendliness manufacturing method by permitting a re-processing of the material remaining after a pre-processing. This prevents the production of sponge wastes produced when the primary foam molded form is processed into a large board plank and cut into the shape of shoe component.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A method for manufacturing shoe components using EVA based composition, said method comprising:

a first step of cutting an EVA copolymer-based film having a thickness of 0.01 to less than 2 mm;

a second step of stacking and/or combining a plurality of the cut films within a cavity of a molding mold, at least a part of a surface of each said film being in direct contact with at least a part of an adjacent film;

a third step of covering said molding mold and applying heat and pressure to said molding mold; and a fourth step of releasing pressure from said molding mold, removing the cover, and permitting said EVA copolymer-based film to foam.

2. A method for manufacturing shoe components according to claim 1, wherein at least one of the plurality of said EVA copolymer-based films has a thickness of 0.1 to 1.0 mm.

3. A method for manufacturing shoe components according to claim 1, wherein said EVA copolymer-based film is provided with enhanced physical properties or appearance by mixing a staple fiber or textile fabric, non-fabric, artificial leather, foam rubber compound and/or thermoplastic resin composition into an EVA copolymer during an EVA copolymer-based film manufacturing processes.

4. A method for manufacturing shoe components according to claim 1, wherein at least one of said EVA copolymer-based films is provided with enhanced physical properties or appearance by bi-component calender molding the film type EVA copolymer with woven fabric or the film having watersoluble polymer; processing the molded material into a tape or wire type material; weaving or knitting the material; and solving the watersoluble polymer.

5. A method for manufacturing shoe components according to claim 1, wherein a textile fabric and/or non-fabric, natural/artificial leather and rubber are used together with at least one of said films used in said second step.

6. A method for manufacturing shoe components according to claim 1, wherein said plurality of EVA copolymer-based films includes two or more types with different physical properties and colors.

7. A method for manufacturing shoe components according to claim 1, wherein said plurality of EVA copolymer-based films includes two or more types having one or more regular or random patterns and/or characters printed thereon.

8. A method for manufacturing shoe components according to claim 1, wherein at least one of said plurality of EVA copolymer-based films has a plurality of holes perforated therethrough in a wide variety of shapes or is cut into one or more films.

9. A method for manufacturing shoe components according to claim 1, wherein said plurality of EVA copolymer-based films is stacked and/or combined in said second step, using a sheet and/or pellet type material or EVA polymer material which is cooling molded into the state before foam production.

10. A method for manufacturing shoe components according to claim 1, wherein one or more EVA copolymer-based films used in said second step are stacked and/or combined by using an EVA copolymer preform.

11. A method for manufacturing shoe components according to claim 10, wherein said EVA copolymer preform has a stereographic shape.

12. A method for manufacturing shoe components according to claim 1, wherein a film mixed with a pigment or additives for exhibiting colors or visual effects different from the color of said stacked plurality of EVA copolymer-based films, is disposed at the top, rear or side surface of the layer of said stacked films, during the stacking of said film.

13. method for manufacturing shoe components according to claim 1, further comprises a step of accommodating a structure into said stacked plurality of EVA copolymer-based films and removing the structure after a foam molding process so as to form a space in the layer of said stacked films.

14. A method for manufacturing shoe components using EVA based composition, said method comprising:

a first step of cutting an EVA copolymer film having a thickness of 0.01 to less than 2 mm;

a second step of stacking and/or combining a plurality of the cut films within a cavity of a molding mold;

a third step of covering said molding mold and applying heat and pressure to said molding mold; and a fourth step of releasing pressure from said molding mold, removing the cover, and permitting said EVA copolymer film to foam, wherein said films are stacked and/or combined in said second step, in such a manner that the lateral side of heel or rear foot or arch of mid foot is further hardened as compared other parts so as to achieve increased supporting force, and the medial side of heel or rear foot or center of fore foot has a cushioning capability, elasticity and restoring force relatively higher than those of the lateral side of heel or rear foot or arch of mid foot.

15. A method for manufacturing shoe components according to claim 14, said plurality of EVA copolymer-based films are stacked and/or combined in said second step, in such a manner that the part of shoe contacting toes of the wearer has a low hardness and high cushioning capability, and the arch has a supporting force, thus permitting each part of a single form to have different physical properties.

16. A method for manufacturing shoe components according to any one of claim 1 to claim 13, further comprises a step of injecting a film or form passed through the foaming process into a molding die and compression re-molding the film or form.

17. A method for manufacturing shoe components according to claim 16, further comprising a mixed stacking-combining step of mixing a foam thermoplastic resin and/or rubber material with a predetermined portion and/or layer in said second step and stacking and/or combining the mixture; and a bonding step of bonding shoe components formed of different materials and passed through the compression re-molding process.

18. A method for manufacturing shoe components according to claim 17, wherein the material used in said mixed stacking-combining step is disposed at the lowest layer in said cavity of said molding die.

* * * * *